United States Patent
Huffman et al.

(10) Patent No.: US 11,310,433 B1
(45) Date of Patent: Apr. 19, 2022

(54) USER-CONFIGURABLE, GESTURAL ZOOM FACILITY FOR AN IMAGING DEVICE

(71) Applicant: INTERNATIONAL BUSINESS MACHINES CORPORATION, Armonk, NY (US)

(72) Inventors: Joel Russell Huffman, Austin, TX (US); Stefan A. G. Van Der Stockt, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/102,610

(22) Filed: Nov. 24, 2020

(51) Int. Cl.
*H04N 5/232* (2006.01)
*G06F 3/08* (2006.01)
*G06F 3/00* (2006.01)
*G06F 3/01* (2006.01)
*G06F 3/048* (2013.01)

(52) U.S. Cl.
CPC ..... *H04N 5/23296* (2013.01); *H04N 5/23258* (2013.01)

(58) Field of Classification Search
CPC ..... G06F 3/00; G06F 3/01; G06F 3/02; G06F 3/011; G06F 3/017; G06F 3/88; G06F 2203/04806; G06F 3/012; G06F 3/013; G06F 3/08; G06F 3/002; G06F 3/0487; G06F 3/005; G06F 9/50; H04N 5/23296; H04N 5/23258; H04N 1/00381; G09G 5/00; G06G 3/011
See application file for complete search history.

(56) References Cited

U.S. PATENT DOCUMENTS

| | | | |
|---|---|---|---|
| 5,839,000 A | 11/1998 | Davis, Jr. et al. | |
| 9,304,591 B2* | 4/2016 | Cromer | G06K 5/00 |
| 9,628,699 B2 | 4/2017 | Cheng et al. | |
| 9,690,334 B2 | 6/2017 | Myers et al. | |
| 10,462,374 B2 | 10/2019 | Tsubusaki | |

(Continued)

FOREIGN PATENT DOCUMENTS

| | | |
|---|---|---|
| KR | 10-2015-0103240 A | 9/2015 |
| KR | 10-2015-0127674 A | 11/2015 |

OTHER PUBLICATIONS

Flores et al., "Camera Distance from Face Images", ISVC 2013, Par II, LNCS 8034, pp. 513-522, 2013.

(Continued)

*Primary Examiner* — Marly S Camargo
(74) *Attorney, Agent, or Firm* — Jeffrey Ingalls, Esq.; Kevin P. Radigan, Esq.; Heslin Rothenberg Farley & Mesiti P.C.

(57) ABSTRACT

Gestural zoom operation of an imaging device is facilitated by receiving, by one or more processors, zoom configuration data of a user for configuring gestural zoom operation of the imaging device, where the imaging device includes a gestural zoom mode with a zoom function that is user-configurable, and by configuring for the user, by the one or more processors, the gestural zoom operation of the imaging device for the gestural zoom mode. The configuring uses the received zoom configuration data, and includes configuring the zoom function for the user and mapping a selected portion of the configured zoom function to a gestural range of the user of the imaging device.

19 Claims, 20 Drawing Sheets

(56) References Cited

U.S. PATENT DOCUMENTS

| | | | |
|---|---|---|---|
| 2012/0038546 A1* | 2/2012 | Cromer | G09G 5/00 345/156 |
| 2013/0044135 A1* | 2/2013 | Lee | G09G 5/00 345/660 |
| 2014/0184854 A1 | 7/2014 | Musatenko | |
| 2017/0071171 A1 | 3/2017 | Hanson | |
| 2019/0379822 A1* | 12/2019 | Leong | H04N 5/232 |

OTHER PUBLICATIONS

Horwitz, Jeremy, "Innoventions Wins Patent On Skin-Based Virtual Touchpad for Wearables", published online at: https://venturebeat.com/2019/10/16/innoventions-wins-patent-on-skin-based-virtual-touchpad-for-wearables/, on Oct. 16, 2019 (1 page).

Mel et al., "The NIST Definition of Cloud Computing," National Institute of Standards and Technology, Information Technology Laboratory, Special Publication 800-145, Sep. 2011 (pp. 1-7).

IBM Publication, "z/Architecture Principles of Operation," IBM® Publication No. SA22-7832-12, 13th Edition, Sep. 2019 (pp. 1-2000).

\* cited by examiner

USER-CONFIGURABLE, GESTURAL ZOOM FACILITY FOR AN IMAGING DEVICE

BACKGROUND

Imaging devices, such as handheld digital cameras, as well as a variety of other portable or handheld electronic devices, including smartphones and tablet computers with integrated cameras, allow a user to capture digital images, including pictures and video. Typically, to capture an image, a user enters a camera mode of the imaging device, and the display of the device is used as a viewfinder depicting the image to be captured. Where the display is a touchscreen, the display can also serve as an input means. For instance, the display can include virtual buttons or inputs that allow a user to capture an image, as well as make adjustments to the camera operation, such as the focus target, or changing the zoom. However, when the user is holding the imaging device in one hand, and using the other hand to press inputs on a display, the stability of the device camera can be compromised, potentially resulting in movement of the camera and blurring of the captured image. Further, if the device user only has one hand available, the user may not be able to make a desired camera adjustment or capture an image as desired.

SUMMARY

Certain shortcomings of the prior art are overcome and additional advantages are provided through the provision, in one or more aspects, of a computer program product to facilitate gestural zoom operation of an imaging device. The computer program product includes a computer-readable storage medium having program instructions embodied therewith. The program instructions are readable by one or more processors to cause the one or more processors to receive zoom configuration data of a user for configuring gestural zoom operation of the imaging device, where the imaging device includes a gestural zoom mode with a zoom function that is user-configurable; and to configure for the user gestural zoom operation of the camera for gestural zoom mode. The configuring of the gestural zoom operation uses the received zoom configuration data, and includes configuring the zoom function for the user and mapping a selected portion of the configured zoom function to a gestural range of the user of the imaging device.

Computer systems and computer-implemented methods relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
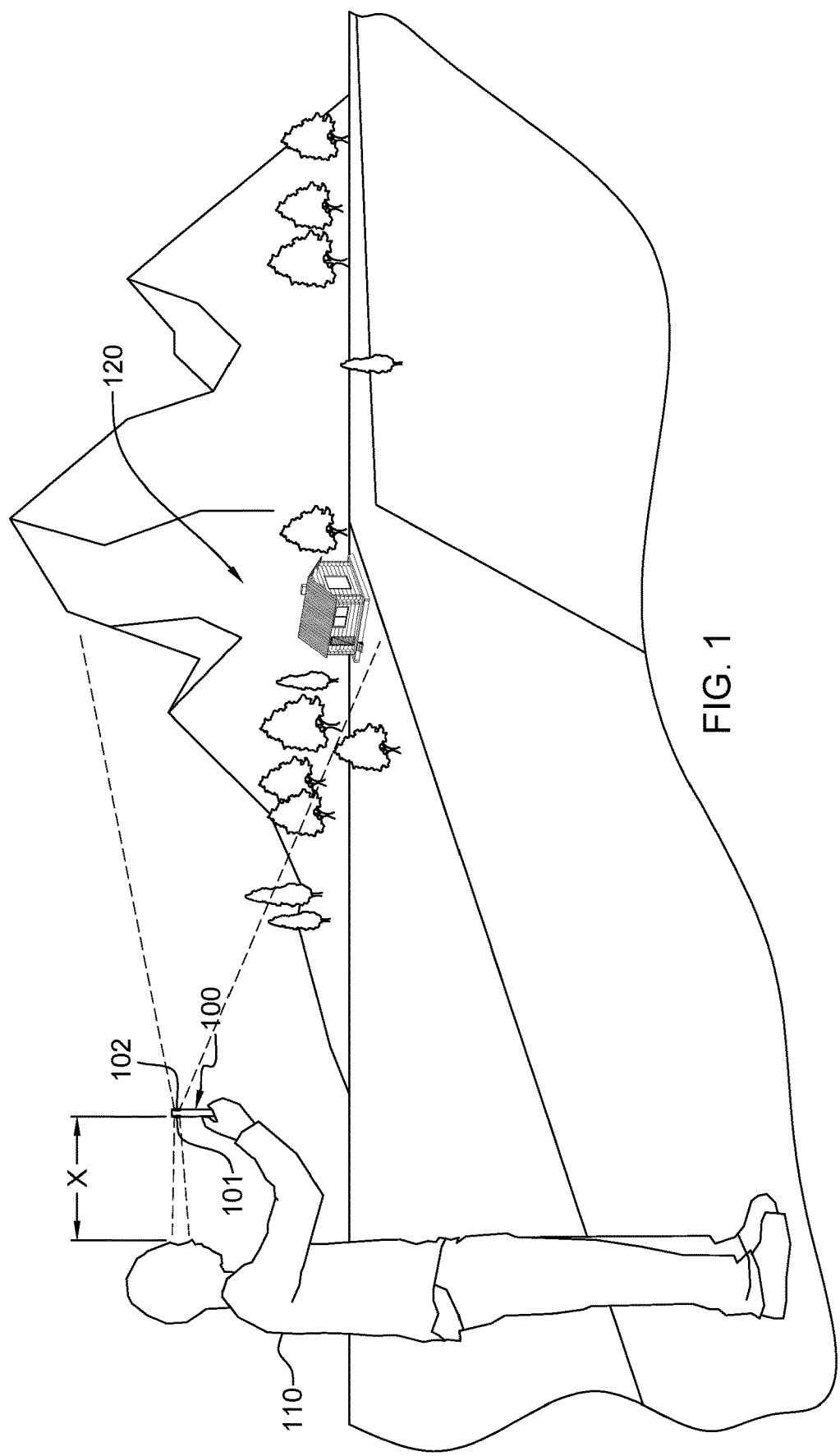
FIG. 1 illustrates one embodiment of a user using an imaging device with forward-facing and backward-facing integrated cameras and a gestural zoom mode to facilitate capture of an image, in accordance with one or more aspects of the present invention.

The accompanying figures, in which like reference numerals refer to identical or functionally similar elements throughout the separate views, and which are incorporated in and form a part of the specification, further illustrate the present invention and, together with the detailed description, serve to explain aspects of the present invention. Note in this regard that descriptions of well-known systems, devices, processing techniques, etc., are omitted so as not to obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of one or more of the concepts disclosed herein.

Note also that illustrative embodiments are described below using specific code, designs, architectures, protocols, layouts, schematics, devices, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed devices, systems, applications, or architectures. One or more aspects of an illustrative embodiment can be implemented in hardware, software, or a combination thereof.

Figure 11:
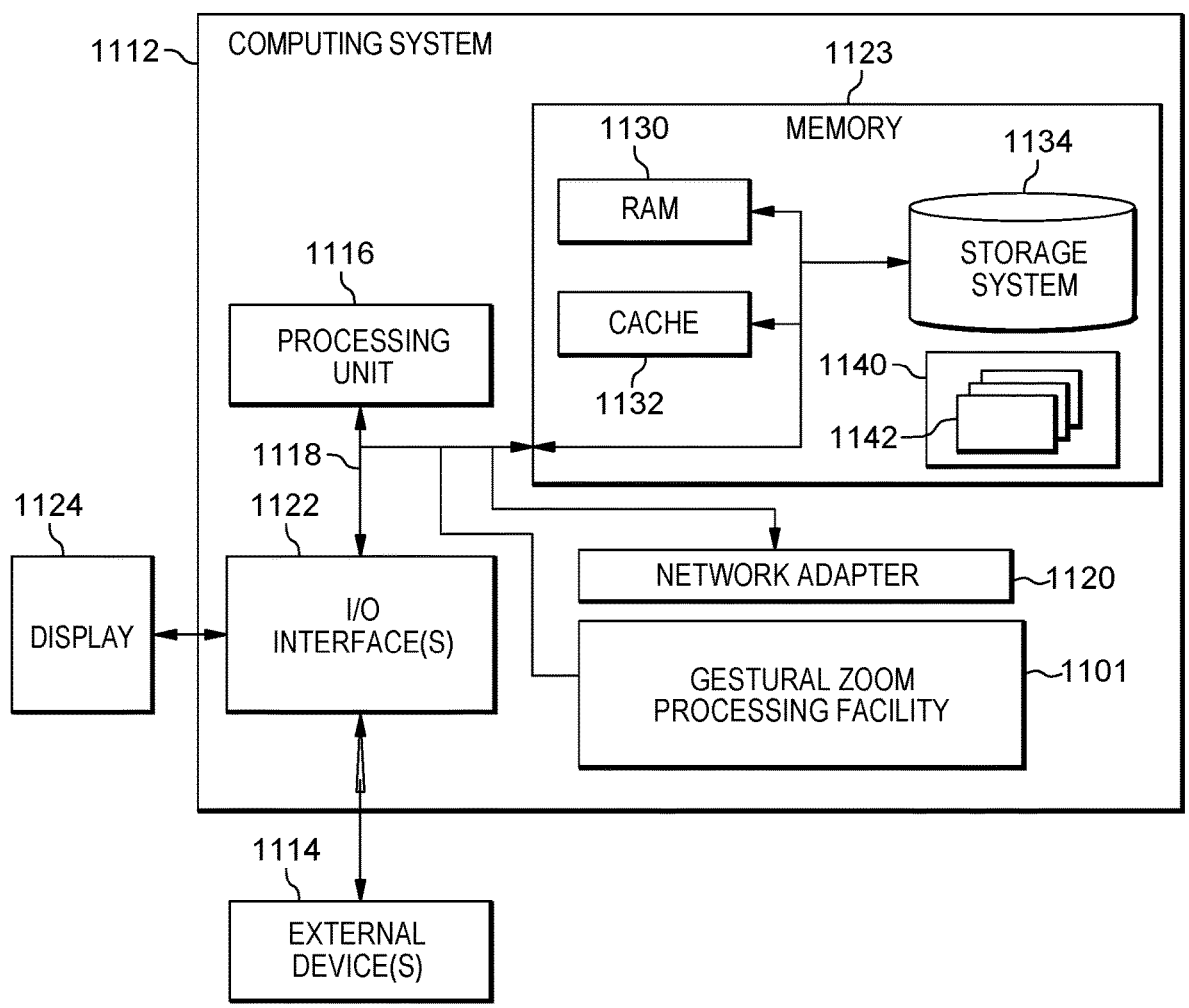
FIG. 11 depicts another embodiment of a computing system, or imaging device, which can implement or facilitate implementing gestural zoom processing, in accordance with one or more aspects of the present invention.

As understood by one skilled in the art, program code, as referred to in this application, can include both software and hardware. For example, program code in certain embodiments of the present invention can include fixed function hardware, but other embodiments can utilize a software-based implementation of the functionality described. Certain embodiments combine both types of program code. One example of program code, also referred to as one or more programs or program instructions, is depicted in FIG. 11 as program/utility 1140, having a set (at least one) of program modules 1142, which can be stored in memory 1123. As a further example, in FIG. 4, program code implementing one or more aspects described herein could be stored or resident within main memory 408, read-only memory 424, disk storage 426, CD-ROM 430, and/or in one or more other peripheral devices of a computing environment 400.

As noted above, imaging devices, such as portable or handheld digital cameras, as well as smartphones, tablet computers, etc., with integrated cameras, allow a user to capture digital images, including pictures and video. Typically, to capture an image, a user enters a camera mode of the imaging device, with the display of the device being used as a viewfinder depicting the image to be captured. When the display is a touchscreen, the display can also serve as an input means. For instance, the display can include virtual buttons or inputs that allow a user to capture an image, as well as to make adjustments to camera operation, such as to the focus target, or to change the zoom. However, if the user is holding the device in one hand, and using the other hand to press and/or otherwise manipulate inputs on the display, the stability of the device camera can be compromised, potentially resulting in movement of the camera and blurring of the captured image. Further, if the user has only one hand available, the user may not be able to make a desired camera adjustment, or capture an image as desired.

Features are continually being integrated into imaging devices (such as noted herein) to facilitate the user's use of the device including, for instance, artificial intelligence, facial recognition, gestural shutter control, etc. One new capability disclosed herein is an ability to do gestural zoom of the camera with, for instance, a user's arm movement while holding the imaging device. With gestural zoom operation, a change in distance of the imaging device from the user can be determined from image data captured via a user-facing, or forward-facing, camera, and used to change the zoom level of the camera. With gestural zoom mode, the user determines the digital zoom of the camera based on how the user moves the camera in front of them. This is a natural way to control the zoom level, as it corresponds with the user's natural vision. The farther the camera is moved from the user, the finer the detail in gestural zoom mode, and the more zoomed-in the image is, while the closer the camera is moved to the user, the broader the image captured by the camera, and therefore, the more zoomed-out the image. This method also gives control to a user without requiring the user to use two hands, one to hold the camera and the other to make a zoom control adjustment. Thus, a more natural, gestural, and accessible, approach for zooming an imaging device camera is achieved.

As a further enhancement, disclosed herein is the introduction of a zoom function or transfer function that allows the distance between the user and the handheld imaging device to be converted to a specific zoom level (e.g., focal length) in a selected manner, such as linear, exponential, logarithmic, etc., depending on the user's needs. This allows users, including accessibility users, to completely determine how sensitive and/or how smooth the user wishes the gestural zoom adjustment to be in the gestural zoom mode of the imaging device. In one or more embodiments, the zoom or transfer function is a non-linear function, which offers a wide array of variable options for configuring zoom level change within the gestural range of the user.

In one or more implementations, a computer program product, computer system, and computer-implement method, are presented to facilitate gestural zoom operation of an imaging device, such as a camera feature of an electronic imaging device, by receiving zoom configuration data of a user for configuring gestural zoom operation of the imaging device camera, where the imaging device includes a gestural zoom mode with a zoom function that is user-configurable, and by configuring for the user the gestural zoom operation of the imaging device for the gestural zoom mode. The configuring of the gestural zoom operation uses the received zoom configuration data, and the configuring includes configuring the zoom function for the user and mapping a selected portion of the configured zoom function to a gestural range of the user of the imaging device. In this manner, the zoom operation is specifically configured for the particular user of the device, and in particular, to the user's gestural range, as well as to the user's preference for the gestural zoom operation within the user's gestural range.

In certain implementations, the zoom function (or transfer function) is a non-linear zoom function that is user-configurable. In one or more embodiments, the configuring for the user of the gestural zoom operation of the imaging device includes setting or selecting, based on the received zoom configuration data, one or more characteristics of the zoom function to configure zoom level change to user-gestural movement within the gestural range of the user of the imaging device.

In one or more implementations, the zoom configuration data includes user-specific zoom sensitivity data for the gestural zoom operation in the gestural zoom mode, and the configuring includes adjusting the zoom function of the gestural zoom mode based, at least in part, the user-specified zoom sensitivity data for the gestural zoom operation, and the mapping includes mapping a selected portion of the adjusted zoom function to the gestural range of the user of the imaging device.

In one or more implementations, the zoom function includes a Sigmoid-type function, and the one or more characteristics include one or more characteristics of the function curve being adjusted, based on the received zoom configuration data for the user. As explained herein, the one or more characteristics can be one or more of an x-axis translation factor, ay-axis translation factor, a slope of the function, or a scaling factor of the function, with the configuration of the zoom function being selected based, at least in part, on the user's zoom configuration data.

In one or more embodiments, configuring for the user the gestural zoom operation of the imaging device in the gestural zoom mode includes identifying, based on the received zoom configuration data, the gestural range of the user of the imaging device, with the received zoom configuration data including gestural range data for the user specifying a minimum operational distance and a maximum operational distance of the imaging device from the user's face in the gestural zoom mode of the imaging device.

In accordance with one or more embodiments, the computer program product, computer system and computer-implemented method disclosed herein establish a causal link between a specific level of zoom of the imaging device camera in the gestural zoom mode of the device, and the distance between the imaging device and the user's face (that is, the face of the person taking the image using the imaging device camera). In certain embodiments, this causal link is customizable by the user for a user-configurable gestural zoom process.

Embodiments of the present invention advantageously constitute an unconventional and unique combination of elements that solve a practical problem. For instance, embodiments of the present invention provide program code executing on one or more processors that utilizes various computing-centric data analysis and handling techniques, in order to configure gestural zoom operation of an imaging device with a gestural zoom mode, to a particular user's preferences, and for the particular user's gestural range. This offers greater accessibility to users and thereby enhances the user experience in operating the imaging device. With the embodiments disclosed herein, a user can fully determine how sensitive a zoom adjustment is to be in a gestural zoom mode of the imaging device, thereby providing enhanced customizability of the user's operation of the imaging device than previously available. In embodiments of the present invention, program code provides significantly more functionality, including but not limited to: 1) program code that receives zoom configuration data of a user for configuring gestural zoom operation of the imaging device, where the imaging device includes a gestural zoom mode with a zoom function that is user-configurable; and 2) program code that configures for the user the gestural zoom operation of the imaging device in the gestural zoom mode. The configuring of the gestural zoom operation uses the received zoom configuration data, and the configuring includes configuring the zoom function for the user and mapping a selected portion of the configured zoom function to a gestural range of a user of the imaging device.

By way of example, FIG. 1 depicts an operational embodiment of a user 110 using an imaging device 100 with a forward-facing, or user-facing, camera 101, and a backward-facing, or facing-away, camera 102, to capture a desired image of, for instance, a scene, object, person, etc., 120. Imaging device 100 is configured with a gestural zoom mode such as described herein, in which movement of imaging device 100 within user's 110 gestural range of motion is converted to a zoom level of the imaging device camera. In one or more implementations, user-facing camera 101 is used, for instance, along with facial recognition and/or artificial intelligence to determine distance 'x' between imaging device 100 and user 110, and thus, positioning of the imaging device within the gestural range of the user. This detection of location of the imaging device within the gestural range is used, in one or more embodiments, to determine a zoom level for the imaging device camera taking the image, that is, for the facing-away camera 102. Thus, in gestural zoom mode, as a user moves the camera closer or farther from the user, zoom level of imaging device camera 102 is automatically changed, which is a natural way to zoom a camera. Examples of this are depicted in FIGS. 2A & 2B.

Figure 2A:
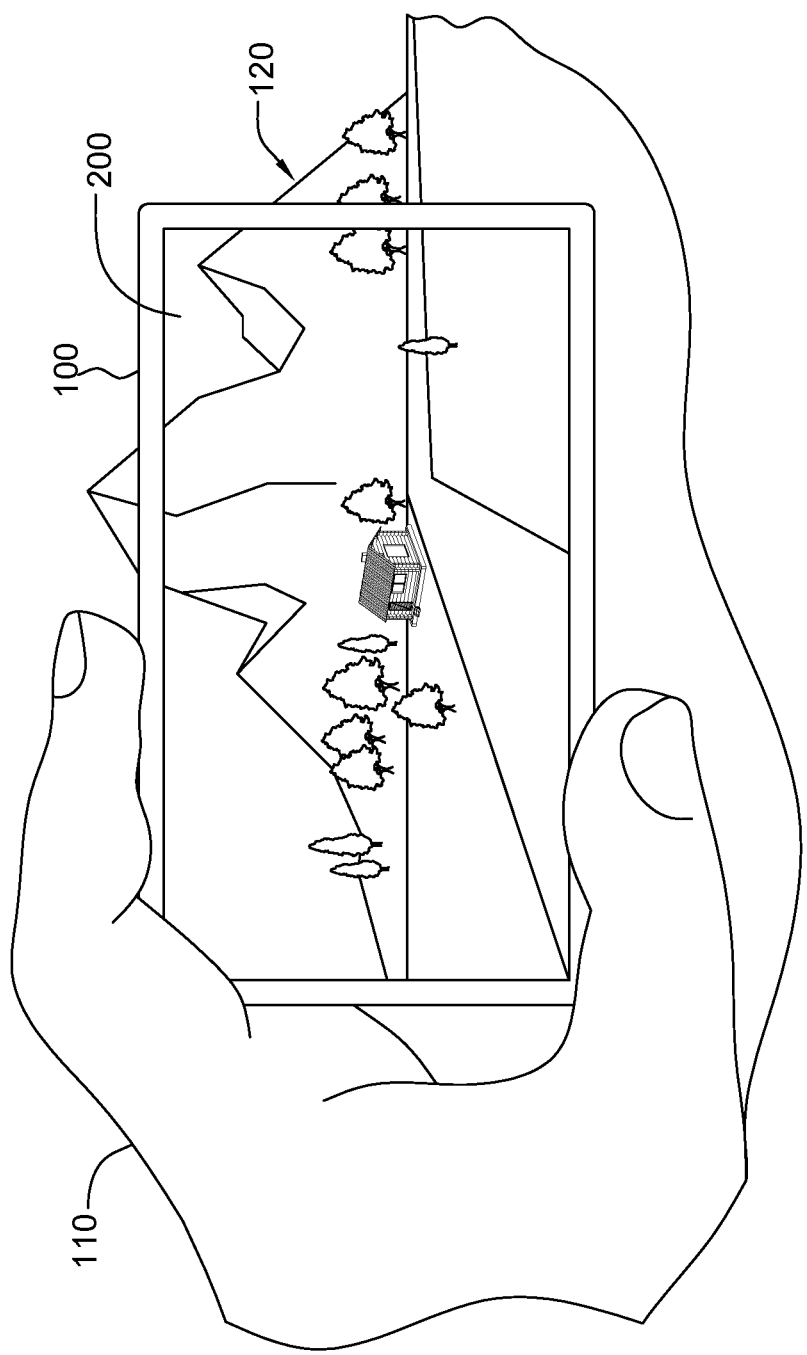
FIG. 2A illustrates one embodiment of gestural zoom operation of the imaging device of FIG. 1, with user-to-camera distance closer to a minimum of the user's gestural range, and the device's zoom level being lower within the associated zoom level range, in accordance with one or more aspects of the present invention.
Figure 2B:
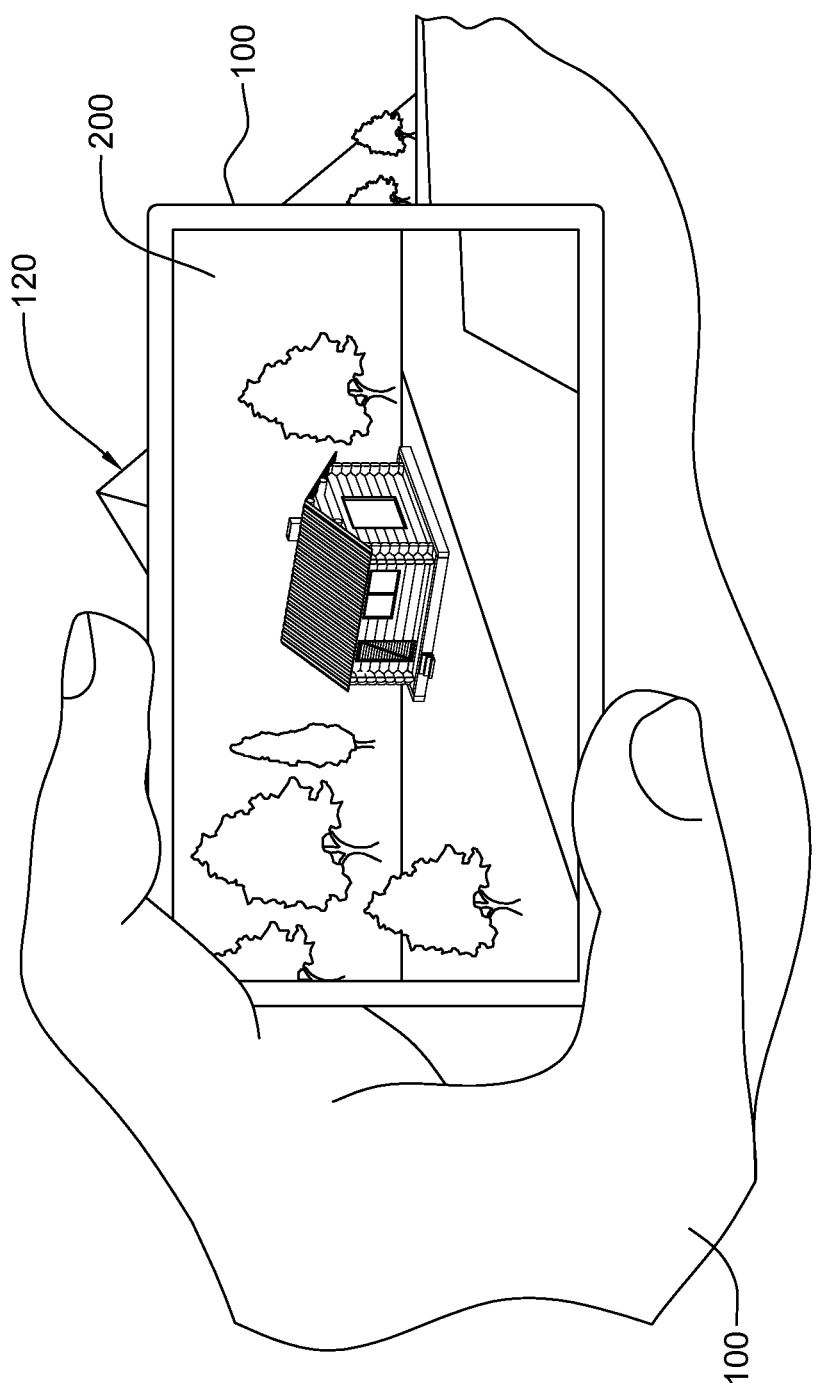
FIG. 2B illustrates another embodiment of gestural zoom operation of the imaging device of FIG. 1, with user-to-camera distance farther from the user, closer to a maximum of the user's gestural range, and the device's zoom level being higher within the associated zoom level range, in accordance with one or more aspects of the present invention.

In FIG. 2A, the image on display 200 of imaging device 100 is a more zoomed-out image of, for instance, scene 120, where a shorter distance 'x' between the user and the imaging device is assumed. Note that, in one or more embodiments, the imaging device uses the user-facing camera and data analysis to determine the distance between one or more of the user's eyes and the imaging device, and responds thereto by providing a wider, more zoomed-out level when the imaging device 100 is closer to user 110, and a more zoomed-in, higher zoom level when imaging device 100 is held farther from user 100, such as assumed in the image depiction of FIG. 2B.

In one or more implementations, detecting distance between the user and imaging device can use the user-facing, or forward-facing, camera available on many imaging devices today, such as smartphones with integrated cameras. In one implementation, the user-facing camera is used to obtain user image data, which is then processed by program code to ascertain distance between, for instance, the user's eyes, with the smaller the distance between the user's eyes, the further imaging device is detected to be away from the user within the gestural range of the user. In one or more other implementations, the user-facing camera can be used to obtain other image data, with program code analyzing the image data to, for instance, obtain pixel data on the user's face, in order to employ facial recognition. With facial recognition, the user's face can be discerned using, for instance, a pretrained model and a cognitive agent or artificial intelligence. Once the imaging device or system understands the user's face, any change in the size of the user's face can be used to determine distance between the user and the imaging device. In many implementations, the only hardware required to implement gestural zoom processing such as disclosed herein is commercially available on many imaging devices, with no custom hardware necessarily required. As noted above, however, one or more aspects of the program code enhancements described herein could be implemented in software, hardware, or a combination thereof.

Gestural zoom processing in accordance with certain aspects disclosed herein includes a configuration or calibration stage and an operational stage. In one or more embodiments, the configuration stage occurs once for a particular user. However, in other embodiments, the user can re-enter configuration stage when desired in order to reconfigure the gestural zoom processing of the imaging device, as desired.

In one or more implementations, in the configuration stage, active configuration or passive configuration is possible. In an active configuration mode, the user can be prompted by the imaging device to position the imaging device at different distances from the user's face. For instance, the imaging device can prompt the user to hold the imaging device at a maximum distance from the user's face, and then to bring the imaging device towards the user's face to a minimum acceptable distance when using the camera. In a passive calibration approach, the imaging device passively collects data over time representative of the minimum distance and data representative of the maximum distance that the imaging device is held by the user from the user's face, thereby ascertaining the gestural range for the specific user over time.

In addition to calibrating the gestural range for the user, the zoom function employed by the gestural zoom operation is also configured or calibrated, based on the user's preference. As explained further below, a zoom function curve, such as a modified Sigmoidal curve, can be fit to a gestural zoom window for the user, based on the user's received zoom configuration data. In one embodiment, distance between the imaging device and the user's face is mapped as x-unit values on a graph, and the zoom level of the imaging device camera (e.g., focal length in millimeters) is mapped to the y-axis of the graph.

Sensitivity of zoom level change within the gestural range of the user can also be configured based on received configuration data of the user. For instance, in one or more embodiments, the user can adjust how rapidly the zoom level changes with change in location of the imaging device relative to the user, such as relative to the user's face. Further, the zoom function can be user-configured to be linear or non-linear, with a non-linear function being adjusted based on sensitivity data obtained from the user, as described herein. Note that the particular configuration of the zoom function is based on the user's preference, which provides enhanced customizability of the imaging device operation to the particular user.

Once calibrated, the gestural zoom operational process is used by a user entering the gestural zoom mode of the imaging device. In one implementation, when a user wishes to take an image or picture, the user enters the camera mode of the imaging device. Based on this, both user-facing and backward-facing cameras are activated, with the image of the backward-facing camera being shown on the display. The user can then enter the gestural zoom mode of the imaging device (such as by pressing a button), where program code uses captured image data of the user-facing camera to detect distance of the imaging device from the user. Further, an initial orientation can be detected. The user can move the imaging device to any point between the minimum and the maximum gestural reach of the user's arm holding the imaging device (in one embodiment). The system uses data from the user-facing camera to detect the current distance of the device from the user, and uses the detected information to set a corresponding zoom level, based on the zoom function configured by the user for the imaging device. The user can extend or retract their arm to adjust the zoom level provided through the gestural zoom processing of the image in the gestural zoom mode. The program code continually adapts the zoom level based on the detected distance between the imaging device and the user. As explained above, in one or more implementations, the farther the imaging device is from the user, the greater the zoom level in the gestural zoom mode, and the closer the imaging device is to the user, the lower the zoom level in the gestural zoom mode. Note that other embodiments are also possible. For instance, in one or more embodiments, the gestural zoom mode can be programmed or configured so that the reverse is true.

One embodiment of a zoom function that governs how distance is converted to zoom level is described in greater detail below. Note that the function coefficients being configured can be user-selected parameters, or parameters indirectly selected by the user through configuration data input to the system, which allows the system to create any sensitivity response that the user desires.

Figure 3:
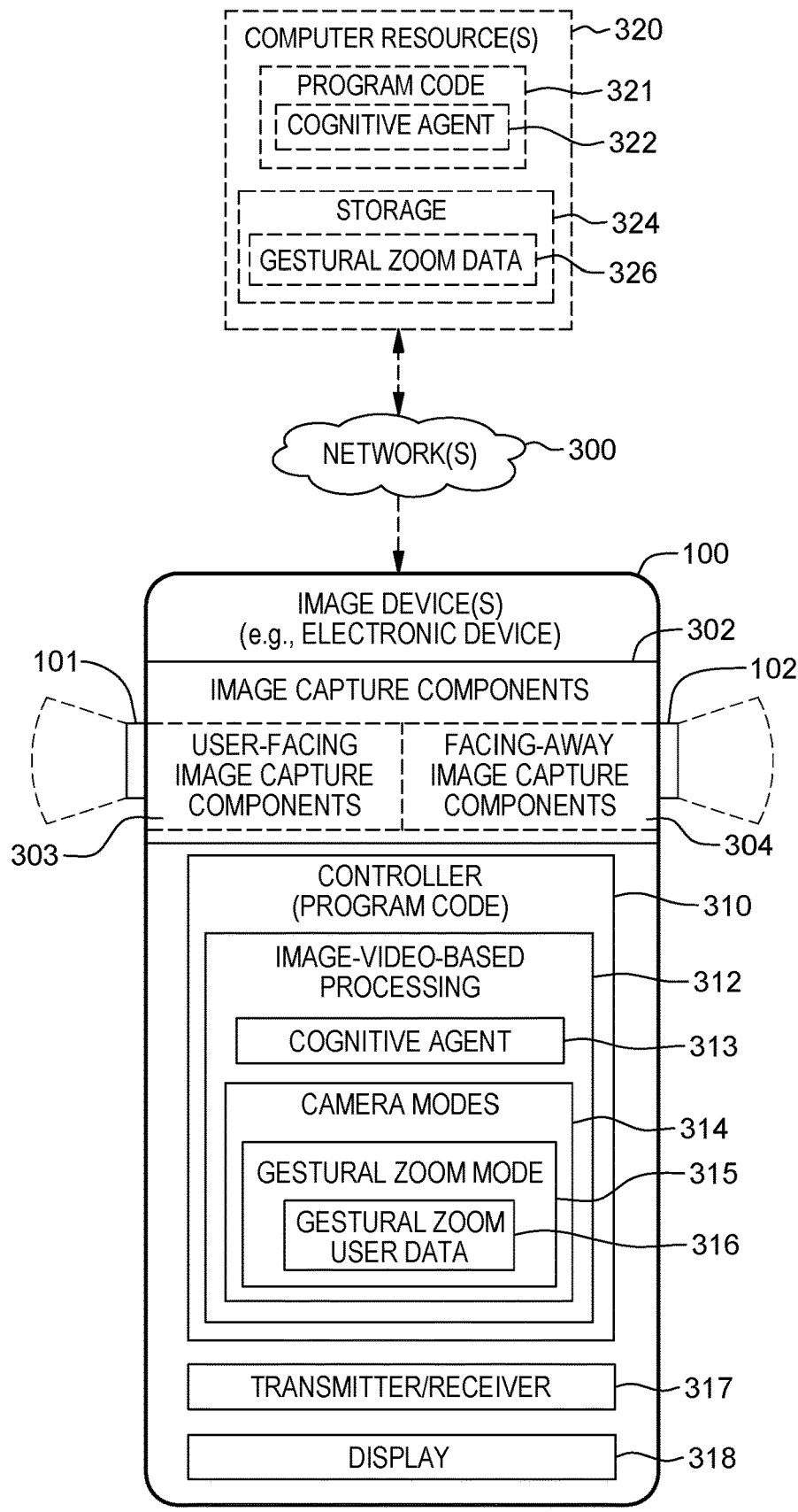
FIG. 3 depicts a block diagram of a technological environment or system in which one or more illustrative embodiments can be implemented.
Figure 4:
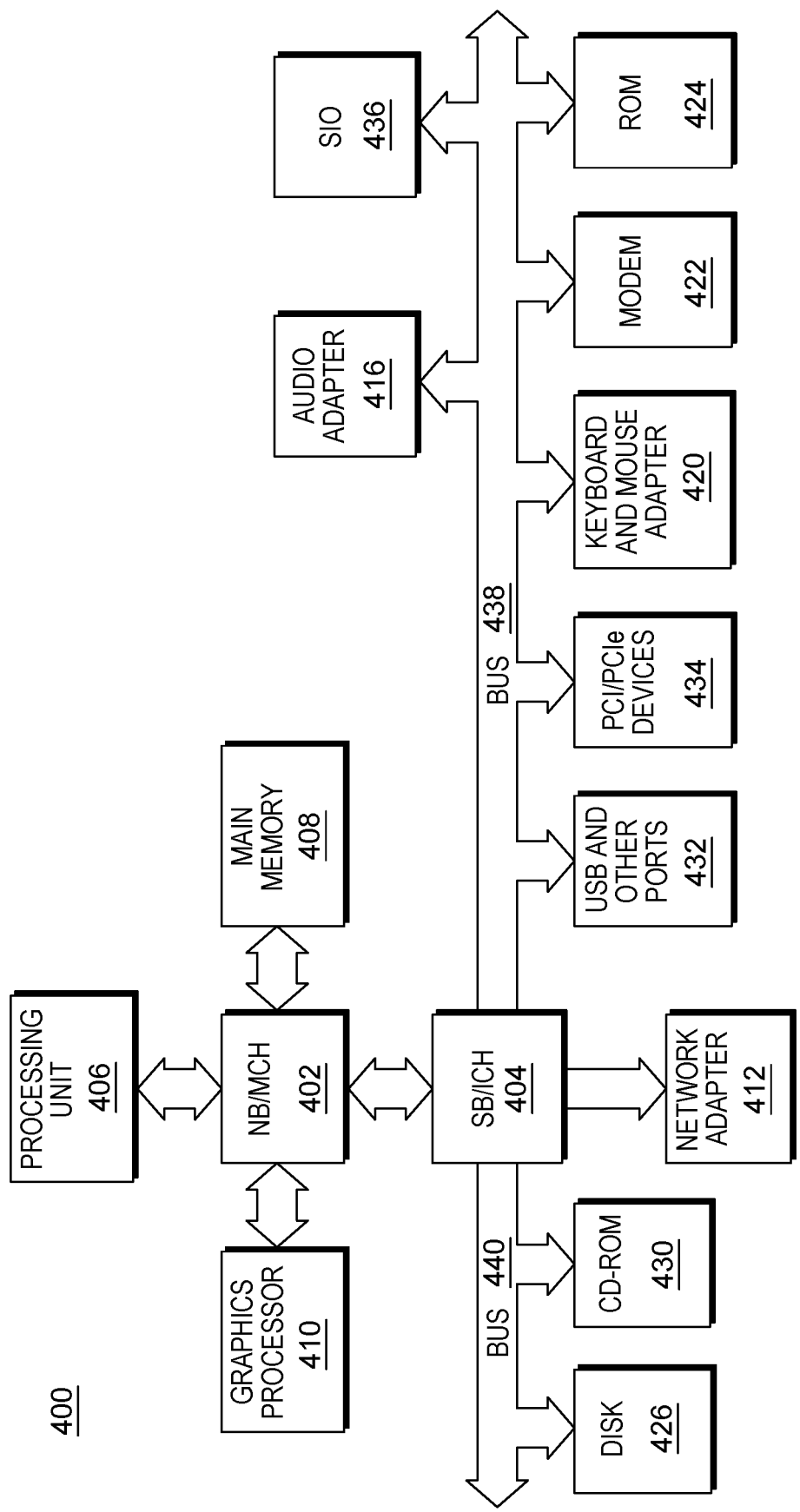
FIG. 4 depicts a block diagram of aspects of a computer system, or imaging device, into which various aspects of an embodiment of gestural zoom processing can be implemented, in accordance with one or more aspects of the present invention.

Before discussing gestural zoom processing further, FIGS. 3 & 4 depict exemplary embodiments of processing environments in which illustrative embodiments can be implemented. FIGS. 3 & 4 are only examples and are not intended to imply limitation with regard to the environments in which different embodiments can be implemented. A particular implementation can have any number of modifications to the depicted environments.

By way of example, FIG. 3 depicts one embodiment of an environment or system into which various aspects of some embodiments of the present invention can be implemented. System 300 includes computing devices, including one or more imaging devices 100, such as an electronic device with integrated cameras. By way of example, in one or more embodiments, imaging device(s) 100 can have a wireless communication capability, and can be, for instance, a handheld electronic device, such as a digital camera or other handheld electronic device with integrated imaging capability, such as an integrated camera and/or video imaging system. For instance, the electronic device can be a smartphone, a wireless computer, a tablet, a personal digital assistant (PDA), a laptop computer, etc.

As an example, one embodiment of imaging device(s) 100 is depicted in FIG. 3. As shown, imaging device(s) 100 can include digital image capture components 302, such as conventional image or video camera components including a user-facing or forward-facing camera 101, and a facing-away or backward-facing camera 102, which have respective user-facing, image-capture components 303 and facing-away, image-capture components 304, in one or more embodiments. Further, a controller, processing module, or program code 310 can be associated with imaging device 100, and can include image-video-based processing 312 for, for instance, facilitating gestural zoom operation, such as described herein. In one implementation, image-video-based processing 312 can include a cognitive agent 313, for instance, to facilitate facial recognition processing to identify distance between the imaging device and the user, as well as one or more camera modes 314, one of which can be a gestural zoom mode 315, such as described herein, which uses gestural zoom user data 316, which can also be saved on imaging device 100. Optionally, imaging device 100 can also include transmitter and/or receiver logic or circuitry 317, and a display 318 for displaying an image being captured. Note that imaging device 100 can include additional components, modules, subsystems, etc., without departing from the spirit of the present invention.

In the exemplary embodiment of FIG. 3, the system can optionally include (in one embodiment) one or more computer resources 320, disposed remote from imaging device (s) 100, as shown. As depicted, computer resource(s) 320 can execute program code 321 implementing, at least in part, a cognitive agent 322, such as an artificial intelligence-based agent, used for visual facial recognition within image data, as discussed herein. Further, computer resource(s) 320 can include storage 324 for storing data, such as gestural zoom data 326, as well as other data, depending on the implementation. In one or more embodiments, computer resource(s) 320 could be, for instance, a cloud-based computer resource (s) that assists with one or more aspects of gestural zoom processing, such as described herein. In one or more other embodiments, the gestural zoom processing can be fully implemented within image device 100.

Where remote computer resource(s) 320 is optionally used, one or more networks 300 can operatively couple imaging device(s) 100 and computer resource(s) 320. By way of example only, network(s) 300 can be, or include, one or more buses, or other links, a telecommunications network, a local area network (LAN), a wide area network (WAN), such as the Internet, or a combination thereof, and can include wired, wireless, fiber optic connections, etc. The network(s) can include one or more wired and/or wireless networks that are capable of receiving and transmitting data, including video and/or image data, as well as other data, depending on the implementation.

As will be understood by those skilled in the art, in one or more implementations, the program code and/or cognitive agent can be, or can use, pre-trained models or algorithms that enable visual content to be evaluated to detect facial features, as desired for a particular application.

In some embodiments of the present invention, the program code can utilize a neural network to analyze images. Neural networks are a biologically-inspired programming paradigm which enable a computer to learn from observational data, in this case, image data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs, or to identify patterns of data (i.e., neural networks are non-linear statistical data modeling or decision making tools). In general, program code utilizing neural networks can model complex relationships between inputs and outputs and identify patterns and attributes of data. Because of the speed and efficiency of neural networks, especially when parsing multiple complex data sets, neural networks and deep learning provide solutions for real-time processing and organizing of data, such as image data, from a variety of types of sources. Neural networks can be used in embodiments of the present invention to cognitively analyze video or other image content for, for instance, facilitating user facial detection and/or recognition, in accordance with certain processes disclosed herein.

A variety of neural networks exist for image processing. The neural network can be generic, or tailored for a particular function. As one specific example only, Watson® Visual recognition for CORE ML brings artificial intelligence into a mobile device space, with pre-trained models available. The Watson® Visual recognition for CORE ML is available through International Business Machines Corporation, Armonk, N.Y., USA. Those skilled in the art will recognize that other artificial intelligence-based platforms are available today, which can be used to implement visual recognition processing such as described herein.

Referring to FIG. 4, a block diagram of a data processing system in which illustrative embodiments can be implemented is shown by way of further example. Data processing system 400 is an example of a computer, such as computer resource(s) 320, and/or imaging device(s) 100 in FIG. 3, or another type of device in which computer-usable program code or instructions implementing processes such as disclosed herein can be located, in one or more embodiments.

In the depicted example, data processing system 400 includes a hub architecture including a north bridge and memory controller hub (NB/MCH) 402 and a south bridge and input/output (I/O) controller hub (SB/ICH) 404. Processing unit 406, main memory 408, and graphics processor 410 are coupled to north bridge and memory controller hub 402. Processing unit 406 can contain one or more processors and even can be implemented using one or more heterogeneous processor systems. Graphics processor 410 can be coupled to the NB/MCH through an accelerated graphics port (AGP), for example.

In the depicted example, a local area network (LAN) adapter 412 is coupled to south bridge and I/O controller hub 404 and audio adapter 416, keyboard and mouse adapter 420, modem 422, read only memory (ROM) 424, universal serial bus (USB) and other ports 432, and PCI/PCIe devices 434 are coupled to south bridge and I/O controller hub 404 through bus 438, and hard disk drive (HDD) 426 and CD-ROM 430 are coupled to south bridge and I/O controller hub 404 through bus 440. PCI/PCIe devices can include, for example, Ethernet adapters, add-in cards, and PC cards for notebook computers. PCI uses a card bus controller, while PCIe does not. ROM 424 can be, for example, a flash binary input/output system (BIOS). Hard disk drive 426 and CD-ROM 430 can use, for example, an integrated drive electronics (IDE) or a serial advanced technology attachment (SATA) interface. A super I/O (SIO) device 436 can be coupled to south bridge and I/O controller hub 404.

An operating system runs on processing unit 406 and coordinates and provides control of various components within data processing system 400 in FIG. 4. The operating system can be a commercially available operating system. An object oriented programming system can run in conjunction with the operating system and provide calls to the operating system from programs or applications executing on data processing system 400.

Instructions for the operating system, the object-oriented programming system, and applications or programs can be located on storage devices, such as hard disk drive 426, and can be loaded into main memory 408 for execution by processing unit 406. The processes of the illustrative aspects discussed herein can be performed by processing unit 406 using computer implemented instructions, which can be located in a memory such as, for example, main memory 408, read only memory 424, or in one or more peripheral devices.

Note that the hardware embodiment depicted in FIG. 4 can vary depending on the desired implementation. Other internal hardware or peripheral devices, such as flash memory, equivalent non-volatile memory, or optical disk drives and the like, can be used in addition to or in place of certain hardware depicted. Also, the processes of the illustrative aspects described herein can be applied to other hardware environments, such as discussed.

In one or more implementations, data processing system 400 can be, or form part of, an electronic imaging device, or a server computer resource, and can be generally configured with flash memory to provide non-volatile memory for storing operating system files and/or user-generated data. A bus system can include one or more buses, such as a system bus, an I/O bus and a PCI bus. Of course the bus system can be implemented using any type of communications fabric or architecture that provides for a transfer of data between different components or devices attached to the fabric or architecture. A communications unit can include one or more devices used to transmit and receive data, such as a modem or a network adapter. A memory can be, for example, main memory 408 or a cache such as found in north bridge and memory controller hub 402. A processing unit can include one or more processors or CPUs. Those skilled in the art should note that the depicted system example of FIG. 4, as well as other examples referenced herein, are not meant to imply architectural limitations. As noted, data processing system 400 can be implemented as part of computer resource(s) 320 and/or as part of imaging device 100 in FIG. 3, such as a part of a digital camera, smartphone, tablet computer, laptop computer, personal digital assistant (PDA), wireless computer, etc., with digital imaging capabilities.

By way of further explanation, FIGS. 5A-10E depict one or more embodiments of gestural zoom processing, in accordance with one or more aspects disclosed herein.

Figure 5A:
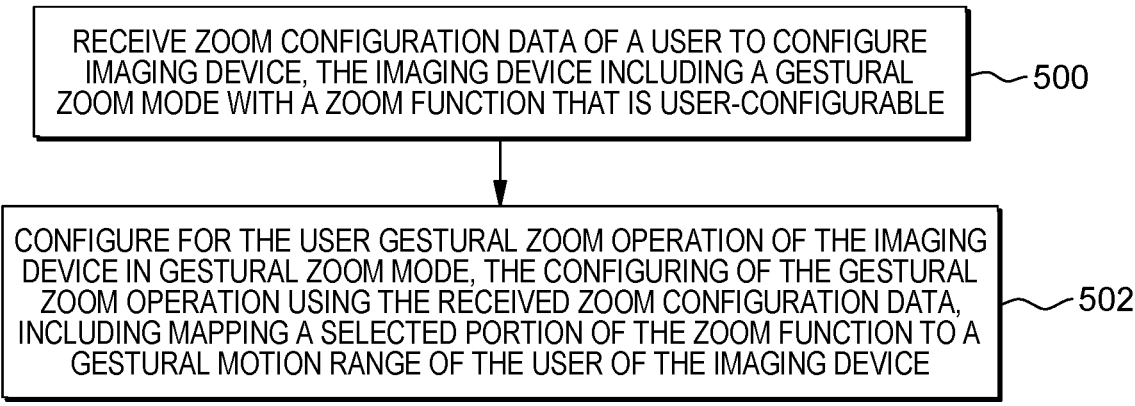
FIGS. 5A-5H depict embodiments of gestural zoom processing for an imaging device, in accordance with one or more aspects of the present invention.

As illustrated in FIG. 5A, in one or more implementations, program code is provided to receive zoom configuration data of a user for configuring an imaging device, with the imaging device including a gestural zoom mode with a zoom function that is user-configurable 500. Further, program code is provided to configure for the user gestural zoom operation of the imaging device in gestural zoom mode, with the configuring of the gestural zoom operation using the received zoom configuration data. In certain embodiments, the configuring includes mapping a selected portion of the zoom function to a gestural motion range of the user holding the imaging device. As noted, in one or more implementations, the zoom or transfer function used by the gestural zoom processing is user-configurable.

Figure 6:
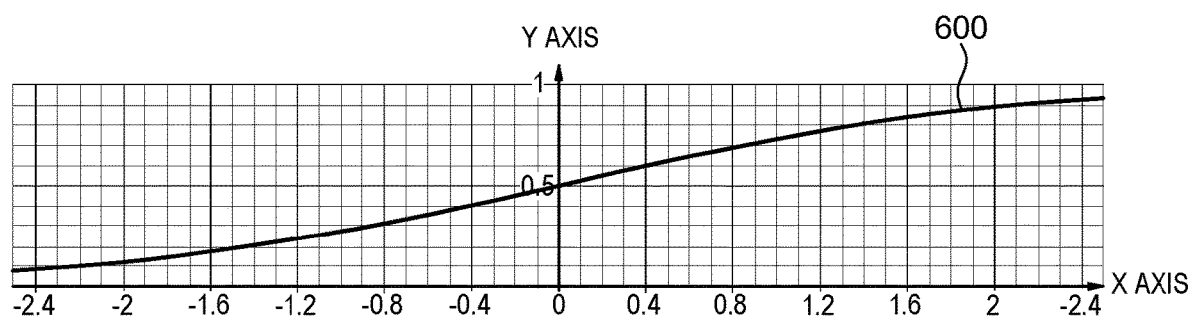
FIG. 6 illustrates one embodiment of a Sigmoid function to be configured as a zoom function for a user-configurable gestural zoom mode of an imaging device, in accordance with one or more aspects of the present invention.

By way of example, FIG. 6 illustrates a base Sigmoid function curve, where the values of the x-axis approach 0 as x tends to negative infinity, and approach 1.0 as x tends to infinity. Further, the Sigmoid function curve illustrated crosses the y-axis at 0.5, when x=0. In accordance with one or more aspects disclosed herein, the base Sigmoid function can be reconfigured and utilized as a zoom function, with the function being configured so that the shape of the curve is calibrated or configured and moved so that it resembles the user's desired transfer sensitivity within an identified gestural zoom window for the user.

Figure 5B:
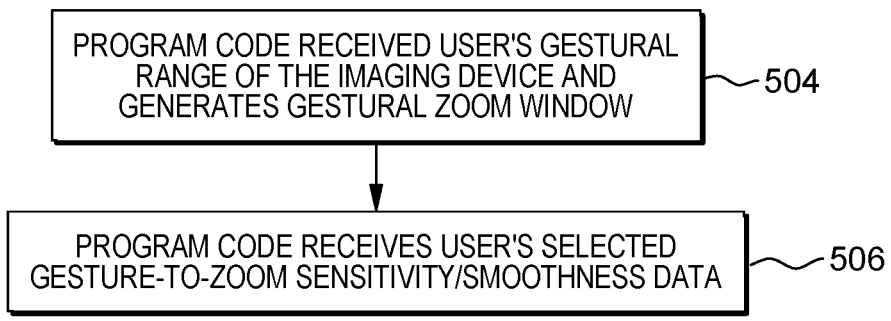

FIG. 5B depicts one embodiment of gestural zoom processing, in the configuration or calibration stage in accordance with one or more aspects. As shown, this processing includes program code to receive a user's gestural range for use of the imaging device, and generating based thereon a gestural zoom window 504, as well as program code to receive user-selected, gesture-to-zoom sensitivity and/or smoothness data 506. This data is used by the program code to bend and translate the shape of the zoom function curve by adding certain variables. In particular, in one or more implementations, the zoom function disclosed herein is defined as the following Equation:

$$F(x) = \frac{1}{1+e^{-S(x+\lambda_x)}} \times \varphi + \lambda_y \quad (1)$$

where:
x=position of imaging device within gestural range of user;
y=imaging device zoom level;
$\lambda_x$=an x-axis translation factor;
$\lambda_y$=an y-axis translation factor;
S=slope of the function; and
$\varphi$=a scaling factor of the function.

Figure 7A:
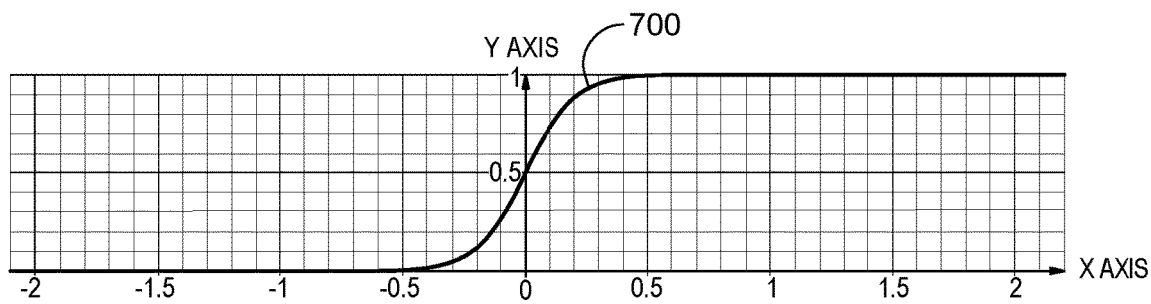
FIGS. 7A-7C illustrate different zoom function configuration embodiments obtained by varying one or more characteristics of a zoom function such as disclosed herein, in order to facilitate configuring gestural zoom operation of the imaging device, in accordance with one or more aspects of the present invention.
Figure 7B:
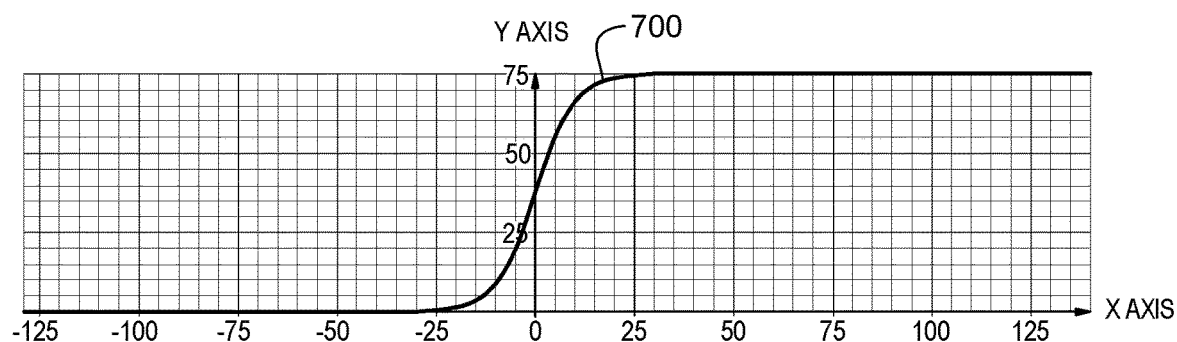
Figure 7C:
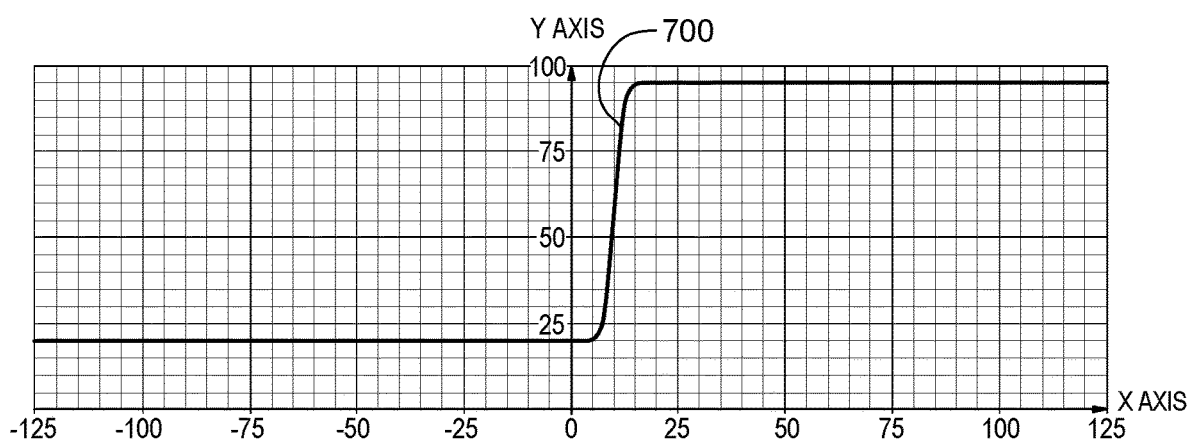

FIGS. 7A-7C illustrate how the variables of Equation (1) control the shape of the zoom function curve, as well as the location of the zoom function curve, such as where intersecting the y-axis.

In FIG. 7A, a representation is shown of how a zoom function curve 700 changes with change in the slope S in the function curve. The slope S determines how steep the line tends towards 1 and 0 on each side of the graph. In the representation of FIG. 7A, the slope S is set to 10, resulting in the function curve illustrated.

In FIG. 7B, they scaling factor $\varphi$ is adjusted or selected to redefine how tall the zoom function curve 700 extends. For instance, if they-axis scaling factor $\varphi$=75, representative of a zoom level of 75 (e.g., a 75 mm zoom), then the function curve asymptotes out at y=75, instead of y=1, as depicted. In one or more embodiments, the y scaling factor represents the zoom level or zoom factor being applied by the gestural zoom process based on the identified location of the imaging device within the user's gestural range.

The x-axis translation factor $\lambda_x$ and y-axis translation factor $\lambda_y$ respectively move the zoom function curve 700 along the x and y-axis, respectively, as illustrated in the example of FIG. 7C. In FIG. 7C, zoom function curve 700 is shifted to the right by 10, and upwards by 20, by setting $\lambda_x$=10, and $\lambda_y$=20, by way of example. In order to set the parameters of the zoom function curve to the user's specific needs or preferences, matching zoom levels are to be identified for the gestural range within which the user is interested in using the gestural zoom feature of the imaging device. Visually, this is equivalent to finding a gestural zoom window on the graph that defines the minimum and maximum x values (i.e., distance of the imaging device from the user), and the minimum and maximum zoom factor (i.e., zoom level) for the gestural range.

Figure 8:
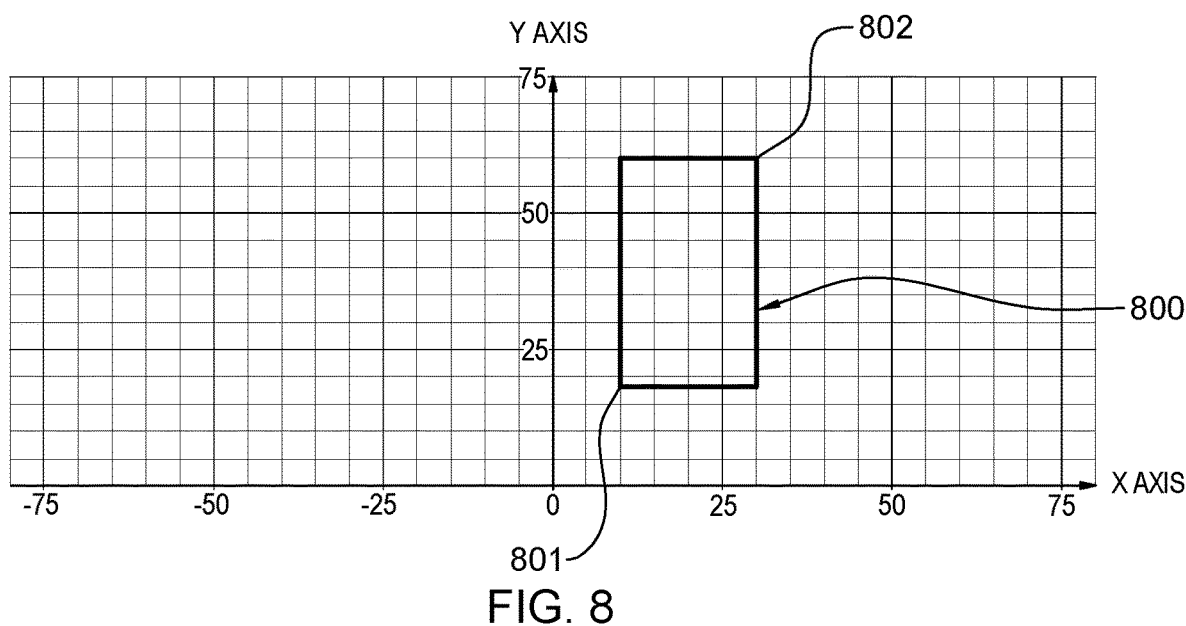
FIG. 8 graphically illustrates one embodiment of a user's gestural zoom window for an imaging device, in accordance with one or more aspects of the present invention.

An embodiment of a gestural zoom window 800 is depicted in FIG. 8. In the embodiment of FIG. 8, it is assumed that the widest zoom level that the user desires is at a distance x=10, such as 10 inches from the user's face, and the deepest telephoto zoom level is set to 30, for instance, 30 inches from the user's face. Also assume that the minimum and maximum zoom levels for the imaging device camera at issue are 20 and 50 (which in millimeters are a typical SLR lens zoom capability). Gestural zoom window 800 is illustrated as a resultant box on the graph. As illustrated, gestural zoom window 800 includes a minimum corner 801, where both x and y values are at a minimum for the window, and a maximum corner 802, where both x and y values are at a maximum for the window. Next, values are ascertained for the parameters of the zoom function to bend the function curve into the obtained gestural zoom window 800, with the bending being representative of the user's preferences.

Figure 9A:
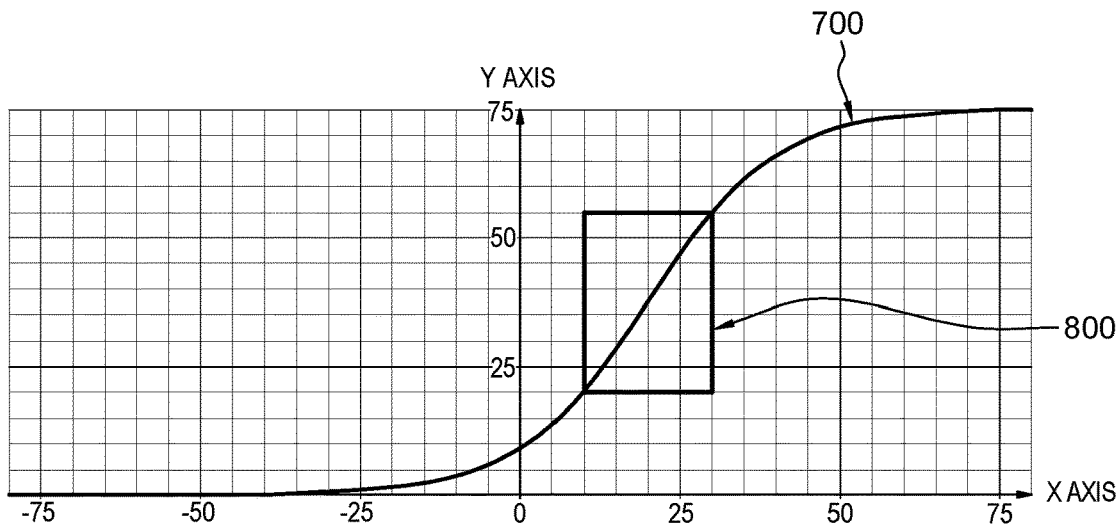
FIGS. 9A-9C depict mapping of different user-configured zoom functions into the gestural zoom window of FIG. 8, in accordance with one or more aspects of the present invention.
Figure 9B:
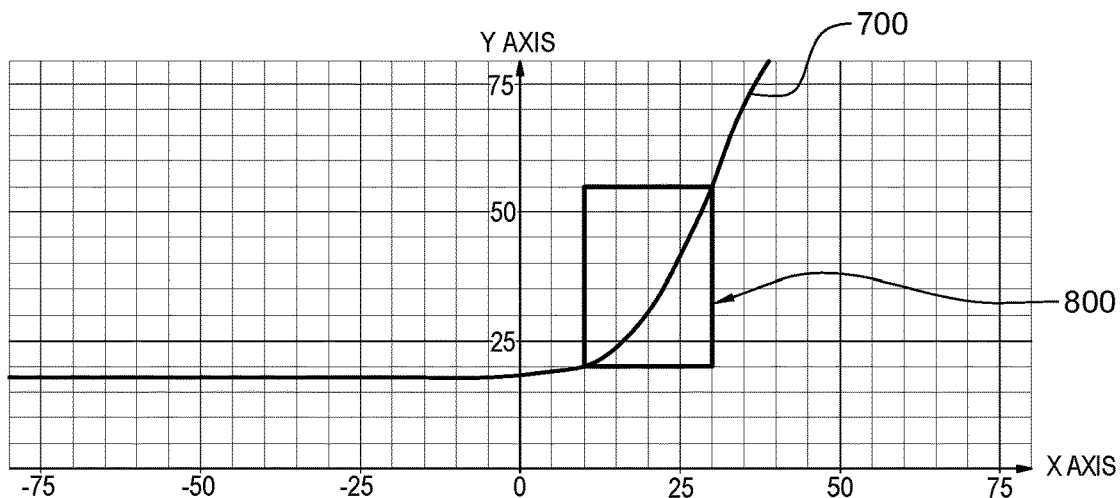

FIG. 9A illustrates one resultant placement and bending of the curve 700 obtained by setting S=1/10, $\lambda_x$=−2, $\varphi$=75, and $\lambda_y$=0. As illustrated in FIG. 9A, the function curve 700 intersects the minimum corner and maximum corner, and within the gestural zoom window 800, is relatively straight. This creates a relatively linear zoom factor, which could be, in one or more embodiments, a default setting, if desired. However, some users may wish the gestural zoom operation be much more sensitive around, for instance, an area where the user's arm holding the imaging device camera is extended (e.g., x≈30 in this example). By setting the slope S=1/6, the x-axis translation factor $\lambda_x$=5, the y-axis translation factor $\lambda_x$=18, and the y-axis scaling factor $\varphi$=75, the function curve is bent and moved to become a curve such as illustrated in FIG. 9B. In this example, note that the zoom (y-axis) does not change much when the imaging device is closer to the minimum distance to the user (approximately 10 inches in this example) while the zoom changes faster as the user moves the imaging device farther out within the user's gestural range (that is, closer to 30), which represents one specific example of a user's preference for the gestural zoom operation.

Figure 9C:
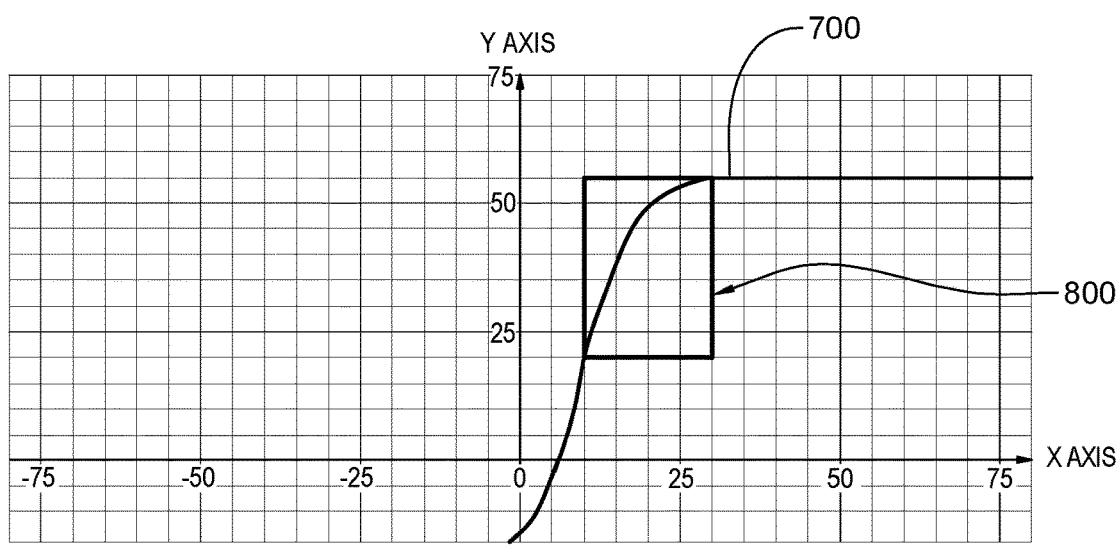

Should the user wish the opposite behavior, where the imaging device camera zooms in quickly close to the user's face, but the zoom change is adjusted more slowly in the area where the user's arm is more extended, then by setting the slope of the function S=1/4, the x-axis translation factor to −2.5, the y-axis translation factor $\lambda_x$ to 20, and the y-axis scaling factor $\varphi$ to 75, a function curve as illustrated in FIG. 9C is obtained within the gestural zoom window 800. Note that in this example, zoom sensitivity is reversed, with the zoom level no longer changing quickly or being sensitive near the user's fully extended arm position, for instance, x=30 inches, while gestural zoom changes much faster closer to the user's minimum distance for holding the imaging device, that is, closer to x=10 in this embodiment.

Figure 5C:
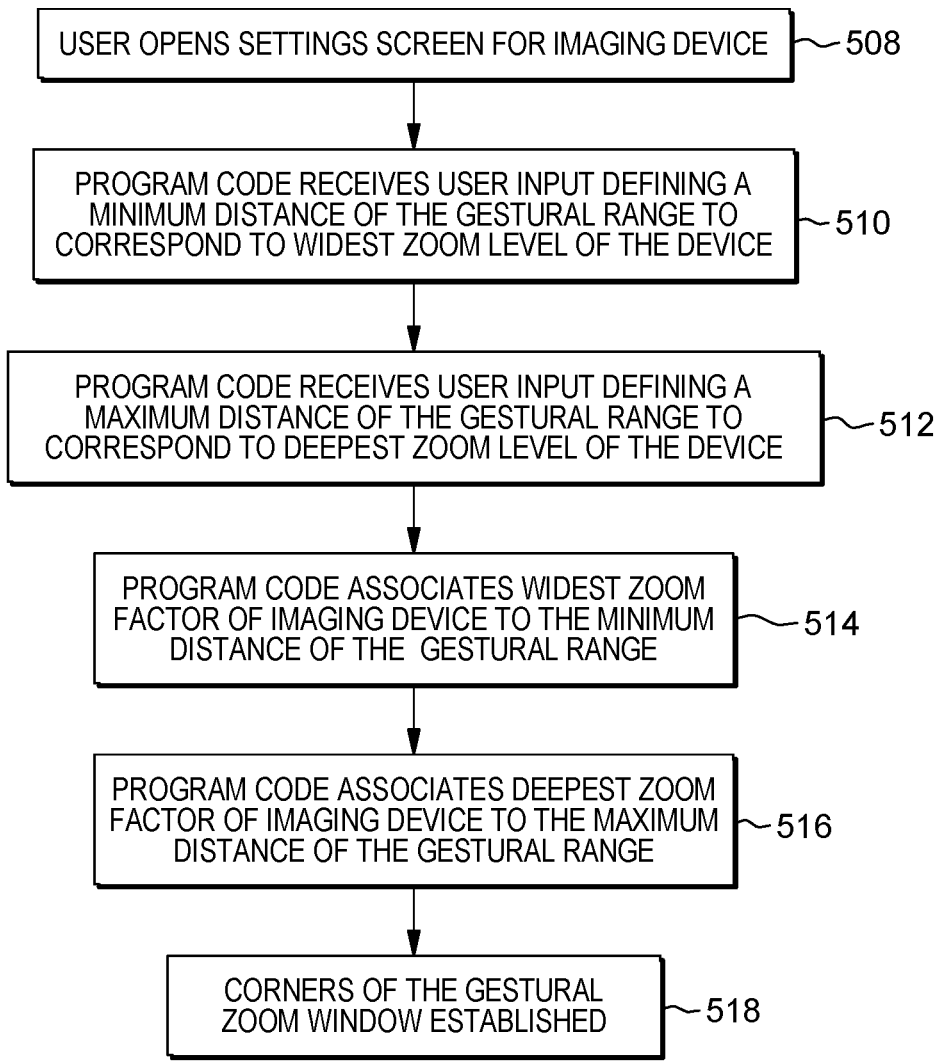
Figure 10A:
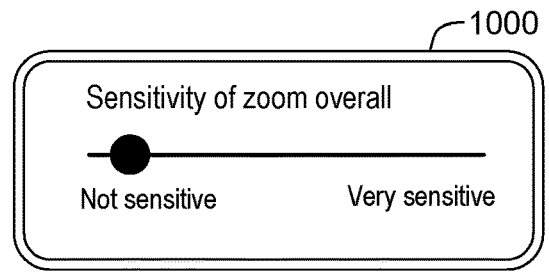
FIGS. 10A-10E depict different display interface embodiments for an imaging device which allow a user to provide zoom configuration input to be used to configure for the user gestural zoom operation of the imaging device, in accordance with one or more aspects of the present invention.
Figure 10B:
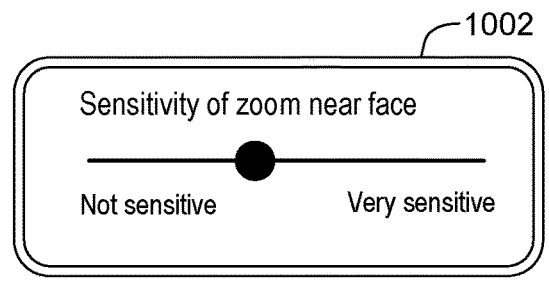
Figure 10C:
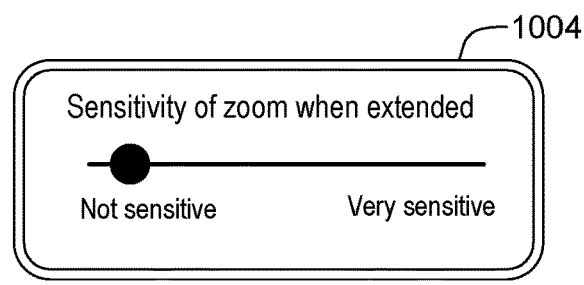
Figure 10D:
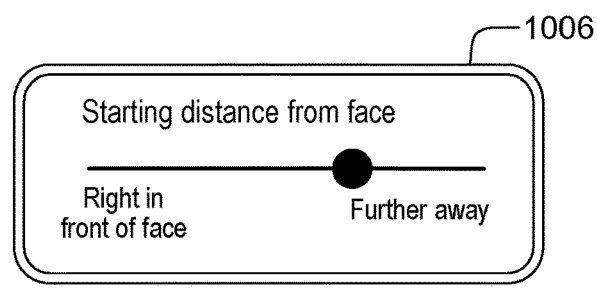
Figure 10E:
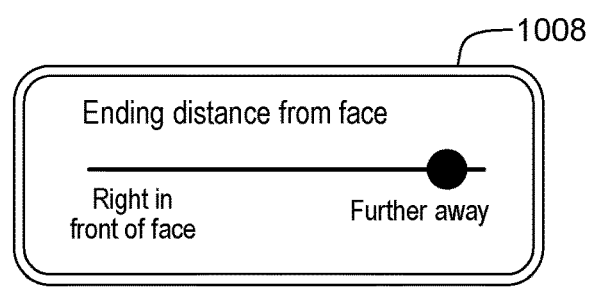

By way of further explanation, FIG. 5C depicts one embodiment of program code provided to determine the gestural zoom window a user. In the embodiment illustrated, the user opens a setting screen for the imaging device camera 508, and program code receives user input for a minimum distance of the gestural range to (in one embodiment) correspond to a widest zoom of the device 510. Additionally, program code receives user input defining a maximum distance of the user's gestural range to correspond to (in one embodiment) the deepest zoom of the imaging device 512. The minimum distance that corresponds to the widest zoom of the camera can be defined, for instance, by the user inputting a specific value for the minimum distance (e.g., in inches) or alternatively by the user moving their arm to a desired minimum location or set point to indicate to the imaging device the minimum distance. For instance, facial features could be employed by the imaging device to learn the associated minimum distance of the imaging device from the user's face. Alternatively, the user could use a slide or other graphical user interface (GUI) window to define the minimum distance that the imaging device will be held to the user in operation. An example of this is depicted in FIG. 10D, where a graphical user interface 1006 can be employed on a display of the imaging device to allow the user to input the minimum distance directly. The maximum distance for the gestural zoom window corresponds, in one or more embodiments, to a deepest zoom of a camera in a gestural zoom mode. This information can similarly be input directly into the imaging device by the user (e.g., in inches), as depicted in FIG. 10E, or can be input responsive to the imaging device prompting the user to move the imaging device to an extended arm position or point that is to correspond to the user's gestural maximum distance, with facial features being used by the imaging device to learn the associated distance that the imaging device is from the user.

As illustrated in FIG. 5C, program code is provided to associate a widest zoom factor of the device to the minimum distance of the user's gestural range 514 and to associate the deepest zoom factor of the imaging device to the maximum distance of the user's gestural range 516. These program code associations can be implemented automatically by the data processing. Program code thus establishes the corners of the gestural zoom window 518 into which the zoom function curve is to be fit with the user's sensitivity and/or smoothness preferences.

Figure 5D:
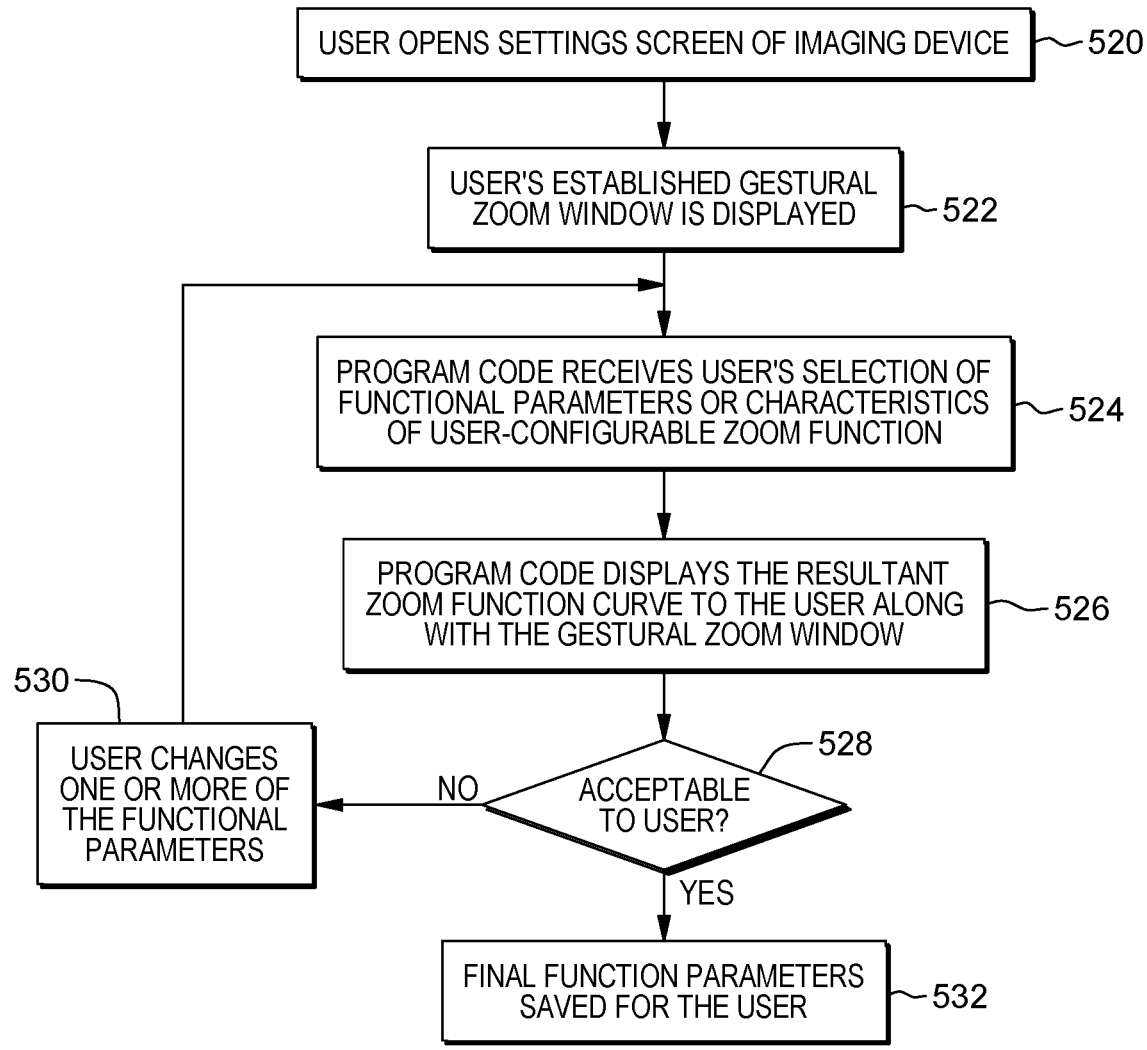

By way of example, FIG. 5D depicts one embodiment of program code to facilitate the user selecting the gestural zoom sensitivity level. As illustrated, in one embodiment, the user opens a setting screen for the imaging device 520 and the established gestural zoom window is displayed 522 on the display of the imaging device. Program code is provided to receive the user's selection of functional parameters or characteristics of the user-configurable zoom function 524, and to display the resultant zoom function curve graphically to the user, along with the gestural zoom window 526. The program code determines whether the gestural zoom function curve is acceptable to the user 528, and if not, receives one or more user changes to the functional parameters 530, after which, the process repeats. Assuming that the gestural zoom function curve is acceptable, then the corresponding, final functional parameters are saved for that user 532.

Note that in one or more implementations, the user does not directly manipulate the zoom function curve, but rather, is presented with one or more graphical interfaces containing human readable options for entering data, which is then used by the program code to manipulate the zoom function curve. The graphical user interfaces can be included within a settings menu of the device, and not actually be used or displayed when the user is using the imaging device to capture an image. For instance, FIG. 10A illustrates one embodiment of a graphical user interface 1000 where overall sensitivity can be configured by the user. Further, a graphical user interface 1002 for user-configuring sensitivity of the zoom operation near the user's face can be provided, as illustrated in FIG. 10B, as well as a graphical user interface 1004 for user-configuring sensitivity of the zoom function when the imaging device is farther from the user as illustrated in FIG. 10C. In addition, if desired, a graphical user interface 1008 can be provided for user-configuring smoothness of the zoom curve within the gestural zoom window.

Figure 5E:
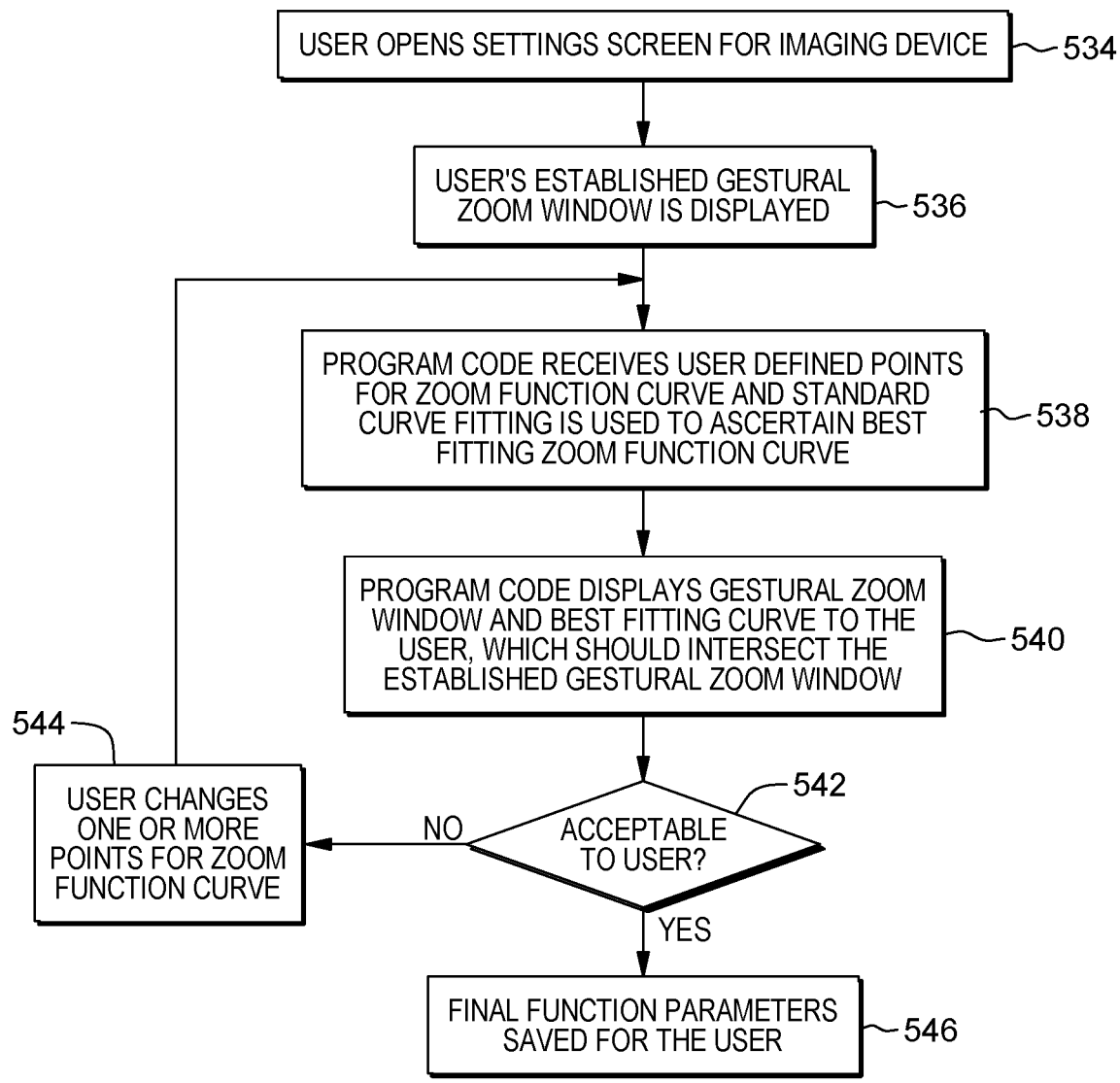

FIG. 5E depicts one embodiment of processing for the user entering zoom configuration data into the imaging device or system in place of a manual approach, such as described above in connection with FIG. 5D. In the embodiment illustrated, the user opens the settings screen for the imaging device 534, and the user's established gestural zoom window is displayed 536. Program code is provided to receive user-defined points for the zoom function curve, and standard curve-fitting is used to ascertain the best-fitting zoom function curve 538. Further, program code is configured to display the gestural zoom window and the best-fitting curve to the user, which should intersect the established gestural zoom window 540. Gestural zoom processing determines whether the best-fitting curve is acceptable to the user 542. If not, then the user changes one or more points for the zoom function curve 544, and the process repeats. Otherwise, the final corresponding function parameters are saved for the user 546.

Figure 5F:
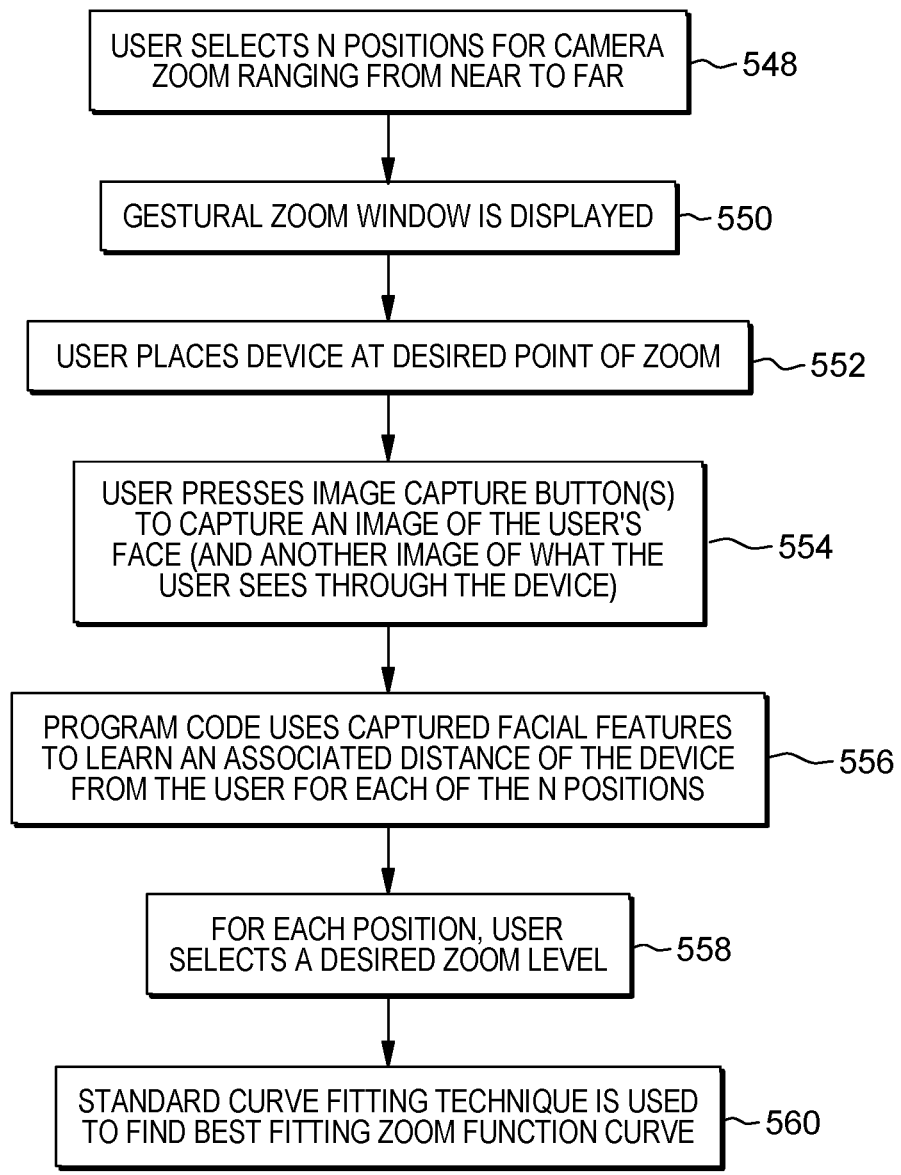

FIG. 5F depicts another implementation for a user to enter zoom configuration data into the imaging device or system. Note that this approach would also be in place of a manual approach, such as described above in connection with FIG. 5D. In this approach, the user selects N positions for the camera zoom ranging from near to far 548. These positions are examples of desired points on the function curve. The gestural zoom window is displayed to the user 550, and the user places the imaging device at a desired point within the gestural range 552. As illustrated, the user presses an image capture button to capture an image of the user face, and another image from the backward-facing camera of what the user is viewing (optionally with a user-set zoom level). Program code analyzes the captured facial features to learn the associated distance that the user is from the device for each of the N positions 556. For each position, the user selects a desired zoom level 558, which can be accomplished using any input technique, such as a graphical user interface illustrating a slide input, a pinched zoom input, etc. Standard curve fitting techniques are used to ascertain a best fit zoom function curve 560 that the user wishes to have within the gestural zoom window. The process can repeat until the user is satisfied with the zoom function curve fitted within the gestural zoom window.

Figure 5G:
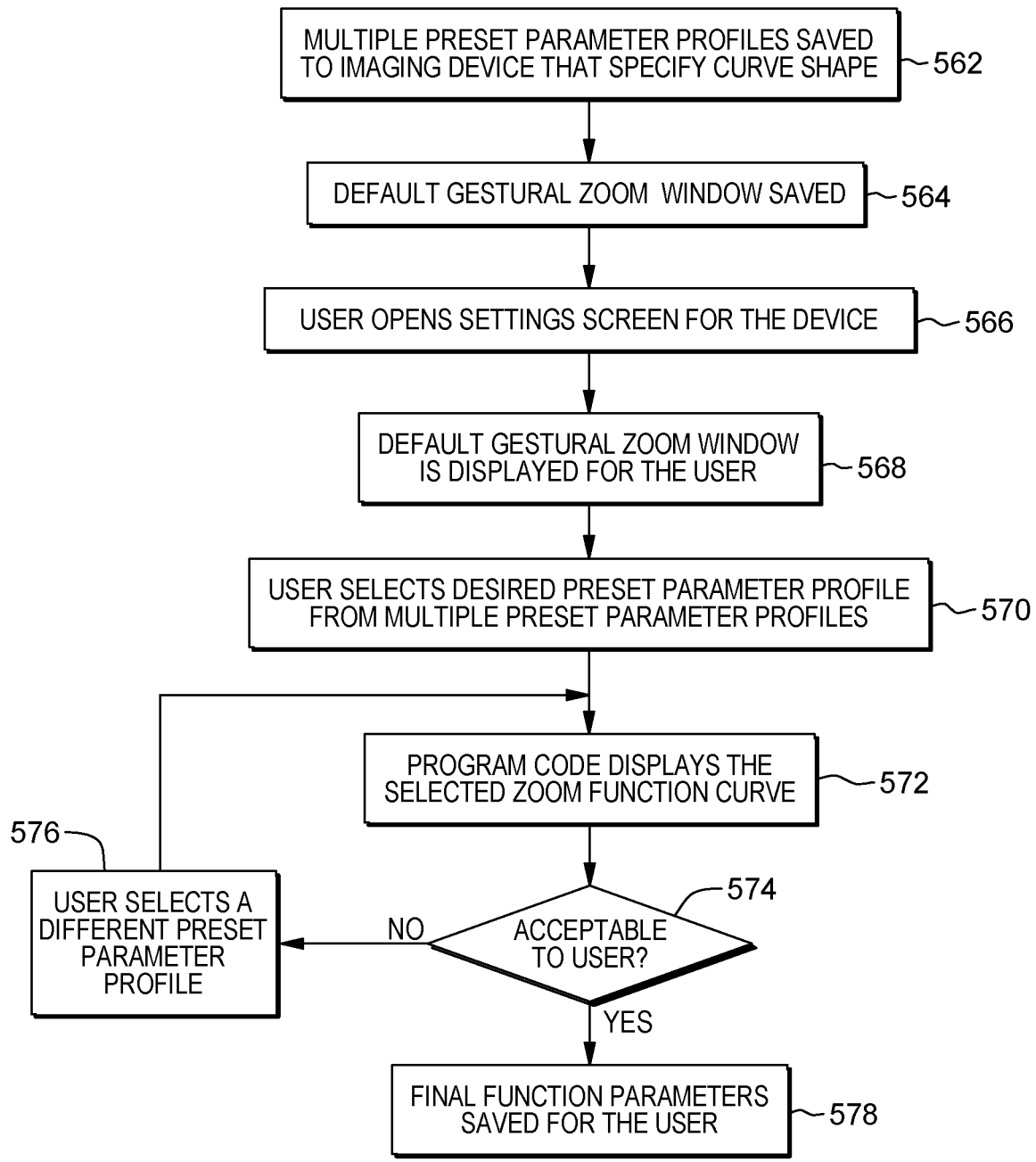

FIG. 5G illustrates another embodiment of program code provided to set the gestural zoom sensitivity for a particular user. In this approach, multiple preset parameter profiles are saved to the imaging device or system that specify various curve shapes 562. For instance, a manufacturer can preset parameter profiles for linear, convex, concave or any other variation using the zoom function parameters described herein. In one embodiment, a default gestural zoom window is saved to the imaging device or system 564. In this approach, the default window can be used for all users, and can contain minimum and maximum distances for the gestural range of the imaging device, as well as narrowest and widest zoom levels for the imaging device.

As illustrated in FIG. 5G, program code receives a user selection of a desired preset parameter profile from the multiple preset parameter profiles 570. By implication, by selecting a desired profile, the associated parameter settings are also selected. Program code displays the selected zoom function curve 572 and default gestural zoom window, and the user indicates to the system if the curve is acceptable 574. If not, then program code receives a different user-selected, preset profile 576, which is then displayed back to the user. Once the zoom function curve is acceptable to the user, the final function parameters are saved for the specific user 578.

Figure 5H:
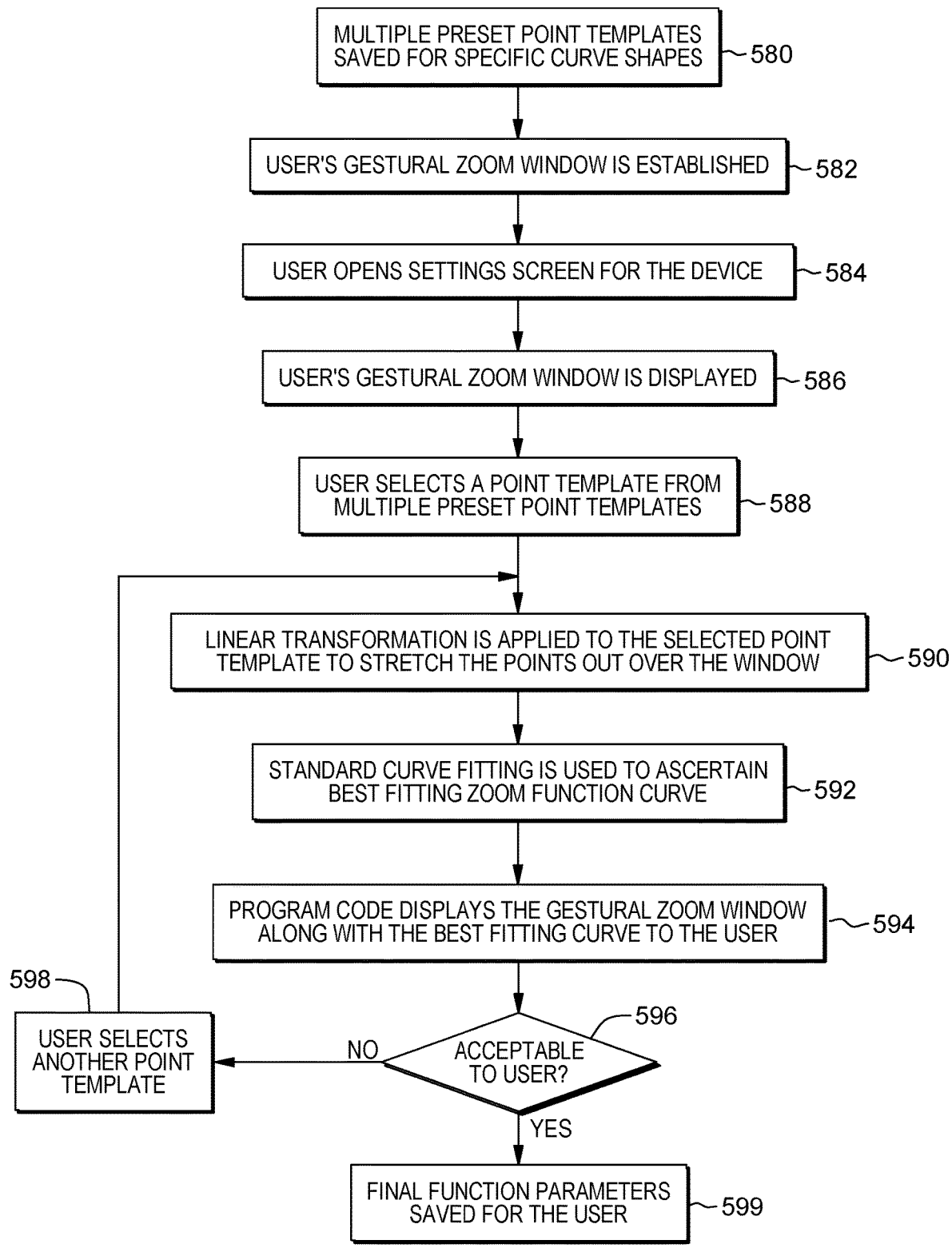

FIG. 5H depicts a further embodiment, where gestural zoom sensitivity level is set using dynamic presets. In this embodiment, multiple preset point templates are saved for specific zoom function curve shapes 580. For instance, the image device manufacturer or gestural zoom mode provider can provide respective preset parameter profiles for linear behavior as points, convex behavior as points, concave behavior as points, or any other variation using the zoom function parameters described above in connection with Eq. (1). The user's gestural zoom window is established 582, such as via a manual process as described above. The user opens a setting screen 584, and the user's gestural zoom window is displayed by the imaging device 586. The user selects a point template from the multiple preset point templates 588. Program code then performs linear transformation on the selected point template to stretch the points out over the gestural zoom window 590, and standard curve fitting is used by the program code to ascertain a best-fitting zoom function curve 592. Program code then displays the best-fitting curve to the user 594, and the user indicates whether the curve is acceptable 596. If not, then the user selects another point template 598 and the process repeats. Once acceptable, the final function parameters are saved for the specific user 599.

Further exemplary embodiments of a computing environment to implement one or more aspects of the present invention are described below with reference to FIGS. 11-13.

By way of further example, FIG. 11 depicts one embodiment of a computing environment 1100, which includes a computing system 1112. Examples of well-known computing systems, environments, and/or configurations that may be suitable for use with computer system 1112 include, but are not limited to, a wireless computer, a handheld or laptop computer or device, a mobile phone, a programmable consumer electronic device, a tablet, a personal digital assistant (PDA), a server, and the like.

Computing system 1112 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 11, computing system 1112, is shown in the form of a general-purpose computing device. The components of computing system 1112 can include, but are not limited to, one or more processors or processing units 1116, a system memory 1123, and a bus 1118 that couples various system components including system memory 1123 to processor 1116.

In one embodiment, processor 1116 may be based on the z/Architecture® offered by International Business Machines Corporation, or other architectures offered by International Business Machines Corporation or other companies.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1112 can include a variety of computer system readable media. Such media may be any available media that is accessible by computing system 1112, and it includes both volatile and non-volatile media, removable and non-removable media.

System memory 1123 can include computer system readable media in the form of volatile memory, such as random access memory (RAM) 1130 and/or cache memory 1132. Computing system 1112 can further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1118 by one or more data media interfaces. As described below, memory 1123 can include at least one program product having a set (e.g., at least one) of program modules or code that are configured to carry out the functions of embodiments of the invention.

Program/utility 1140, having a set (at least one) of program modules 1142, can be stored in memory 1132 by way of example, and not limitation, as well as an operating system, one or more application programs, other program modules, and program data. Each of the operating system, one or more application programs, other program modules, and program data or some combination thereof, can include an implementation of a networking environment. Program modules 1142 generally carry out the functions and/or methodologies of embodiments of the invention as described herein. Alternatively, a gestural zoom processing facility, module, logic, etc., 1101 can be provided within computing environment 1112, as disclosed herein.

Computing system 1112 can also communicate with one or more external devices 1114 such as a keyboard, a pointing device, a display 1124, etc.; one or more devices that enable a user to interact with computing system 1112; and/or any devices (e.g., network card, modem, etc.) that enable computing system 1112 to communicate with one or more other computing devices. Such communication can occur via Input/Output (I/O) interfaces 1122. Still yet, computing system 1112 can communicate with one or more networks such as a local area network (LAN), a general wide area network (WAN), and/or a public network (e.g., the Internet) via network adapter 1120. As depicted, network adapter 1120 communicates with the other components of computing system, 1112, via bus 1118. It should be understood that although not shown, other hardware and/or software components could be used in conjunction with computing system 1112. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
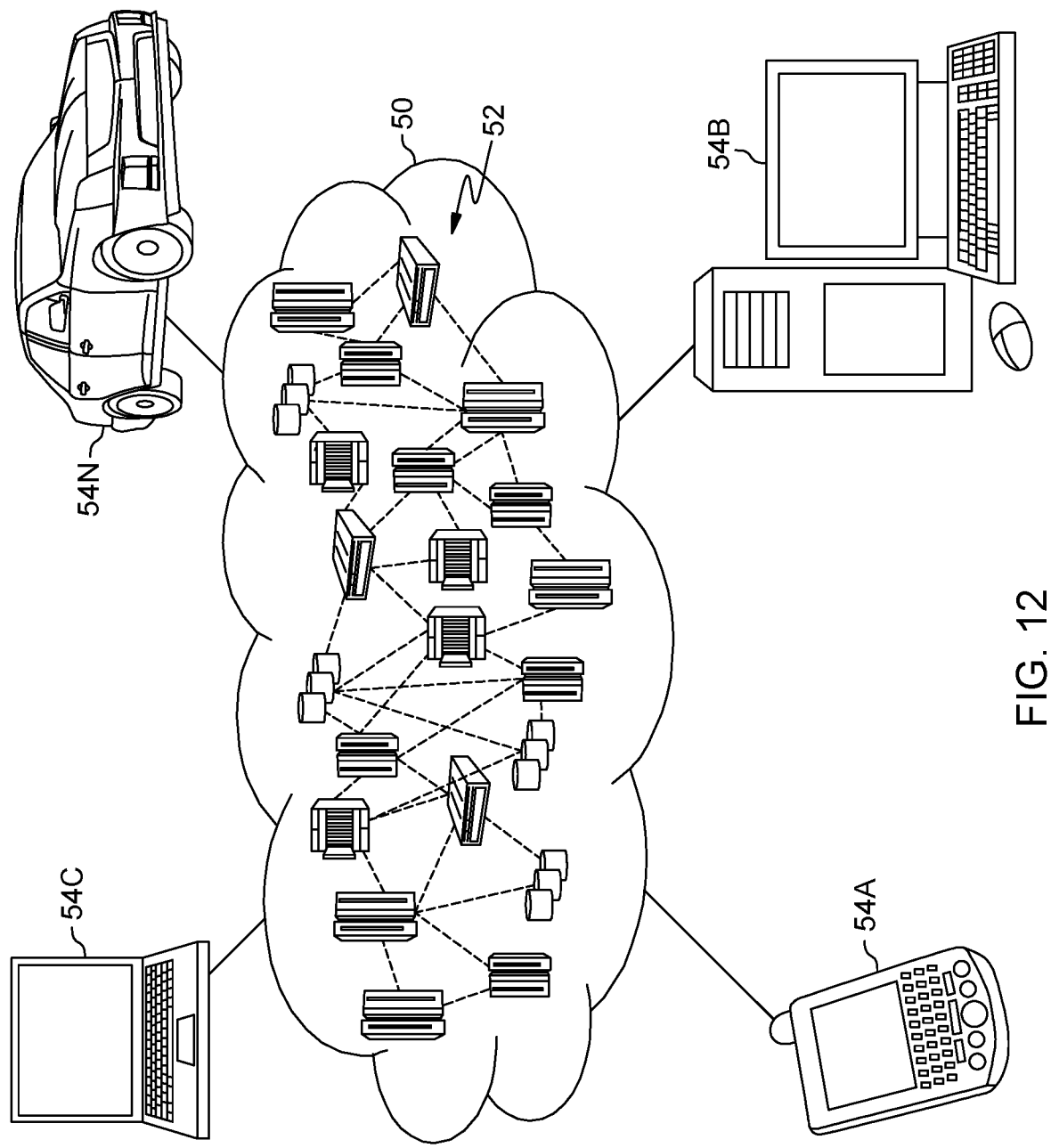
FIG. 12 depicts one embodiment of a cloud computing environment which can facilitate implementing, or be used in association with, one or more aspects of the present invention.

A cloud computing node can include a computer system/server, such as the one depicted in FIG. 12. Computer system/server 1112 of FIG. 11 can be practiced in distributed cloud computing environments where tasks are performed by remote processing devices that are linked through a communications network. In a distributed cloud computing environment, program modules may be located in both local and remote computer system storage media including memory storage devices. Computer system/server 1112 is capable of being implemented and/or performing any of the functionality set forth hereinabove.

Referring now to FIG. 12, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 13:
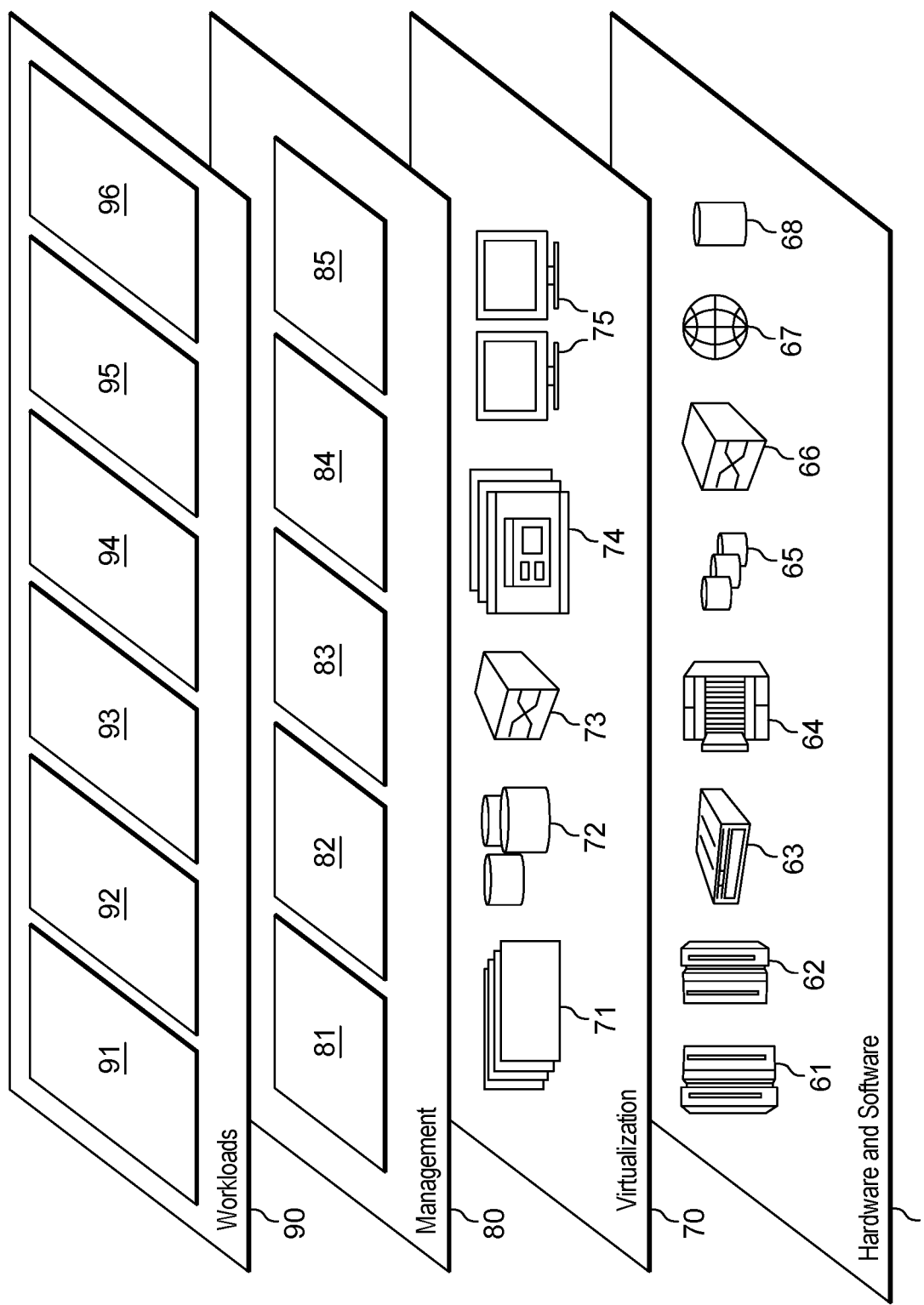
FIG. 13 depicts an example of abstraction model layers according to an embodiment of the present invention.

Referring to FIG. 13, a set of functional abstraction layers provided by cloud computing environment 50 (FIG. 12) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and gestural zoom processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer program product to facilitate gestural zoom operation of an imaging device, the computer program product comprising:
   a computer-readable storage medium having program instructions embodied therewith, the program instructions being readable by one or more processors to cause the one or more processors to:
      receive zoom configuration data of a user for configuring gestural zoom operation of the imaging device, the imaging device including a gestural zoom mode with a transfer function representative of a function curve that is user-configurable; and
      calibrate for the user the gestural zoom operation of the imaging device for the gestural zoom mode, the calibrating of the gestural zoom operation using the received zoom configuration data, and the calibrating including:
         configuring the function curve for the user, wherein the function curve is a non-linear function curve that is user-configurable; and
         mapping a selected portion of the configured function curve to a gestural range of the user of the imaging device.

2. The computer program product of claim 1, wherein the configuring comprises setting, based on the received zoom configuration data, one or more characteristics of the transfer function to configure zoom level change to user-gestural movement within the gestural range of the user of the imaging device.

3. The computer program product of claim 2, wherein the zoom configuration data comprises user-specified zoom sensitivity data for the gestural zoom operation in the gestural zoom mode.

4. The computer program product of claim 3, wherein the configuring comprises adjusting the transfer function of the gestural zoom mode based, at least in part, on the user-specified zoom sensitivity data for the gestural zoom operation, and the mapping comprises mapping a user-selected portion of the adjusted transfer function to the gestural range of the user.

5. The computer program product of claim 2, wherein the transfer function comprises a Sigmoid function and the one or more characteristics comprise one or more characteristics of the Sigmoid function.

6. The computer program product of claim 2, wherein the transfer function (F(x)) comprises:

$$F(x) = \frac{1}{1 + e^{-S(x+\lambda_x)}} \times \varphi + \lambda_y$$

where:
   x=position of imaging device within gestural range of user;
   y=imaging device zoom level;
   $\lambda_x$=an x-axis translation factor;
   $\lambda_y$=any-axis translation factor;
   S=slope of the function; and
   $\varphi$=a scaling factor of the function.

7. The computer program product of claim 6, wherein the one or more characteristics are selected from the group consisting of the x-axis translation factor, they-axis translation factor, the slope of the function, and the scaling factor of the function.

8. The computer program product of claim 1, wherein configuring for the user the gestural zoom operation of the imaging device for the gestural zoom mode comprises identifying, based on the received zoom configuration data, the gestural range of the user of the imaging device, with the received zoom configuration data including gestural range data for the user specifying a minimum operational distance and a maximum operational distance of the imaging device from the user's face in the gestural zoom mode of the imaging device.

9. A computer system for facilitating gestural zoom operation of an imaging device, the computer system comprising:
   a memory;
   one or more processors operatively coupled to the memory; and
   program code executable by the one or more processors via the memory to perform a method comprising:
      receiving zoom configuration data of a user for configuring gestural zoom operation of the imaging device, the imaging device including a gestural zoom mode with a transfer function representative of a function curve that is user-configurable; and
      calibrate for the user the gestural zoom operation of the imaging device for gestural zoom mode, the calibrating of the gestural zoom operation using the received zoom configuration data, and the calibrating including:
- configuring the function curve for the user, wherein the function curve is a non-linear function curve that is user-configurable; and
- mapping a selected portion of the configured function curve to a gestural motion range of the user of the imaging device.

10. The computer system of claim 9, wherein the configuring comprises setting, based on the received zoom configuration data, one or more characteristics of the transfer function to configure zoom level change to user-gestural movement within the gestural range of the user of the imaging device.

11. The computer system of claim 10, wherein the zoom configuration data comprises user-specified zoom sensitivity data for the gestural zoom operation in the gestural zoom mode, and the configuring comprises adjusting the transfer function of the gestural zoom mode based, at least in part, on the user-specified zoom sensitivity data for the gestural zoom operation, and the mapping comprises mapping a selected portion of the adjusted transfer function to the gestural range of the user of the imaging device.

12. The computer system of claim 10, wherein the transfer function comprises a Sigmoid function and the one or more characteristics comprise one or more characteristics of the Sigmoid function.

13. The computer system of claim 10, wherein the transfer function (F(x)) comprises:

$$F(x) = \frac{1}{1+e^{-S(x+\lambda_x)}} \times \varphi + \lambda_y$$

where:
- x=position of imaging device within gestural range of user;
- y=imaging device zoom level;
- $\lambda_x$=an x-axis translation factor;
- $\lambda_y$=any-axis translation factor;
- S=slope of the function; and
- φ=a scaling factor of the function.

14. The computer system of claim 13, wherein the one or more characteristics are selected from the group consisting of the x-axis translation factor, they-axis translation factor, the slope of the function, and the scaling factor of the function.

15. The computer system of claim 9, wherein configuring for the user the gestural zoom operation of the imaging device for gestural zoom mode comprises identifying, based on the received zoom configuration data, the gestural range of the user of the imaging device, the received zoom configuration data including gestural range data for the user specifying a minimum operational distance and a maximum operational distance of the imaging device from the user's face in the gestural zoom mode of the imaging device.

16. A computer-implemented method comprising:
- receiving, by one or more processors, zoom configuration data of a user for configuring gestural zoom operation of an imaging device, the imaging device including a gestural zoom mode with a transfer function representative of a function curve that is user-configurable; and
- calibrate for the user, by the one or more processors, the gestural zoom operation of the imaging device for the gestural zoom mode, the calibrating of the gestural zoom operation using the received zoom configuration data, and the calibrating including:
  - configuring the function curve for the user, wherein the function curve is a non-linear function curve that is user-confiUrable; and
  - mapping a selected portion of the configured function curve to a gestural range of the user of the imaging device.

17. The computer-implemented method of claim 16, wherein the configuring comprises setting, based on the received zoom configuration data, one or more characteristics of the transfer function to configure zoom level change to user-gestural movement within the gestural range of the user of the imaging device.

18. The computer-implemented method of claim 16, wherein the transfer function comprises a Sigmoid function and the one or more characteristics comprise one or more characteristics of the Sigmoid function.

19. The computer-implemented method of claim 16, wherein configuring for the user the gestural zoom operation of the imaging device for the gestural zoom mode comprises identifying, based on the received zoom configuration data, the gestural range of the user of the imaging device, the received zoom configuration data including gestural range data for the user specifying a minimum operational distance and a maximum operational distance of the imaging device from the user's face in the gestural zoom mode of the imaging device.

* * * * *